United States Patent
Okada et al.

(10) Patent No.: US 6,611,347 B1
(45) Date of Patent: *Aug. 26, 2003

(54) PRINT CONTROL APPARATUS, PRINT CONTROL METHOD, STORAGE MEDIUM, AND COMPUTER READABLE PROGRAM PERFORMING A FORM OVERLAY PROCESS

(75) Inventors: Kunio Okada, Kawasaki (JP); Akio Sugaya, Yokohama (JP); Yuki Miyazaki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,201

(22) Filed: Dec. 9, 1997

(30) Foreign Application Priority Data

Dec. 20, 1996 (JP) .............................................. 8-340837
Feb. 28, 1997 (JP) .............................................. 9-046630

(51) Int. Cl.$^7$ .............................................. G06K 15/00
(52) U.S. Cl. ..................................... 358/1.15; 358/1.18
(58) Field of Search ................................. 395/114, 115, 395/117; 358/296, 1.18, 1.9, 1.1–1.8, 1.11–1.14, 1.17; 382/222; 345/629, 630, 641

(56) References Cited

U.S. PATENT DOCUMENTS

| | | | | |
|---|---|---|---|---|
| 4,826,333 A | * | 5/1989 | Tanaka ........................ 400/76 |
| 4,944,614 A | * | 7/1990 | Tanaka ........................ 400/76 |
| 4,992,827 A | * | 2/1991 | Kobayashi et al. ......... 358/296 |
| 5,041,918 A | * | 8/1991 | Ishida et al. ................ 358/442 |
| 5,050,101 A | * | 9/1991 | Kiuchi et al. ............... 395/117 |
| 5,058,035 A | * | 10/1991 | Nagata et al. .............. 395/117 |
| 5,179,658 A | * | 1/1993 | Izawa et al. ................ 395/164 |
| 5,485,245 A | * | 1/1996 | Kobayashi et al. ......... 358/296 |
| 5,687,332 A | * | 11/1997 | Kurahashi et al. .......... 395/335 |
| 5,737,503 A | * | 4/1998 | Mitani ........................ 395/115 |
| 5,872,636 A | * | 2/1999 | Kohtani et al. ............. 395/109 |
| 5,878,198 A | * | 3/1999 | Yuasa et al. ................ 395/117 |

FOREIGN PATENT DOCUMENTS

| | | |
|---|---|---|
| EP | 0 398 681 A2 | 11/1990 |
| EP | 0 554 998 A1 | 8/1993 |
| EP | 0 659 570 A2 | 6/1995 |
| EP | 0 727 732 A1 | 8/1996 |

* cited by examiner

Primary Examiner—Gabriel Garcia
Assistant Examiner—King Y. Poon
(74) Attorney, Agent, or Firm—Fitzpatrick, Cella, Harper & Scinto

(57) ABSTRACT

Print data of each page sequentially sent from a host computer and second print data converted from registered first print data and stored in a memory are developed on the memory to generate a print image under the control of CPU. An overlap print by a printing unit is controlled in accordance with the generated print image. Even if the print style of input print data of each page changes, optimum second print data can be generated in a short time without giving a load on memory resources. Therefore, a print process time of formatted print data such as forms can be shortened and a desired overlay print can be performed efficiently.

62 Claims, 27 Drawing Sheets

PRINT CONTROL APPARATUS, PRINT CONTROL METHOD, STORAGE MEDIUM, AND COMPUTER READABLE PROGRAM PERFORMING A FORM OVERLAY PROCESS

BACKGROUND OF THE INVENTION

1. Field of the Invention

The present invention relates to techniques of printing input data from an external apparatus by performing a form overlay process.

2. Related Background Art

There is a printer of the type that can make various formatted sheets or the like by printing page data, which is different at each page, on a form page of form data, as illustrated in FIG. 15. This function is called "form overlay". More precisely, a plurality set of form data are stored in advance in a printer. Upon a form overlay instruction of page data, designated form data is printed together with page data as many pages as instructed. The form data is developed into a bit map image at each page, and similarly the page data is developed into a bit map image. The two types of image data is ORed to write a synthesized bit map image into a memory and converted into image signals used for printing.

Since the form data is developed into a bit map image at each page, the print process takes a long time and the throughput is lowered. In order to shorten a print process time, in another type of a printer, form data is registered in the form of intermediate codes easy to be converted into a bit map image.

In still another type of a printer, form data converted into bit map images are stored in advance to shorten the print process time.

In order to deal with various types of print styles, such as two-page print (FIG. 10) and enlargement/reduction print, it is necessary to change each form through rotation, reduction or the like. Therefore, form data of intermediate codes stored in advance cannot be used directly.

If bit map images converted from form data are stored in advance, a very large memory capacity becomes necessary particularly in the case of a laser printer or the like having a high resolution. The cost becomes therefore high.

It is necessary for a page printer to store an output image of one page in a bit map memory. In order to store an output image, a full paint system and a banding system have been used. In the former system, a full-page bit map is required, and in the latter system, an output image of one page is generated by a memory (band memory) having a capacity of several fractions of one page.

With the full paint system, a bit map memory of one page is used, and print data is converted into a bit map image in the bit map memory and transferred to a printer mechanism. This system requires a large capacity of a bit map memory, for example, about 8 MB for A3 sheet at a resolution of 600 dpi. However, since an output image of one page is always generated even for a large amount of data or data requiring a long image generation time, the print-out of input data is reliable.

With the banding system, a memory having a capacity of several fractions of one page is cyclically used to form an image in units of band. In this case, print data of one page is stored in the form of intermediate codes, and a fractional bit map memory is used as a ring buffer to control the generation and transfer of an output image synchronously with the print mechanism. As compared with the full paint system, the print operation can be performed with a smaller memory capacity, and at a high speed because of parallel execution of the generation of an output image and the transfer thereof to the printing mechanism.

In order to print the same data on each page of, for example, formatted sheets by the above-described two printing systems, a form overlay function has been incorporated. With this function, formatted sheet data is stored as form data in a printer in advance, and numerical data (called back member data) to be printed in a frame of each formatted sheet is later transferred to synthesize it with the form data.

With conventional form overlay, form data transferred from a host computer is stored in a storage area of a printer in a page description language (PDL) type. Thereafter, back matter data is supplied and analyzed. Upon detection of a completion event (e.g., form feed command) of the analysis, the already stored PDL form data is read to generate intermediate codes. The form data and back matter data are synthesized in the bit map memory to generate an output image (called an event drive macro scheme).

With this scheme, form data of each page is analyzed to generate intermediate codes so that the process time becomes long.

Although the same form data is often used for several pages, it is used as a counterpart of the back member data to generate intermediate codes. Therefore, the intermediate codes of each page cannot be shared with another page. The storage area of the intermediate codes therefore becomes large.

With a conventional form overlay function of another type, form data (PDL data) transferred from a host computer is converted into intermediate code data and stored in a storage area of a printer. Intermediate codes generated from back matter data and the intermediate form data read from the storage area are synthesized on a bit map memory to generate an output image (called an intermediate scheme).

With this conventional intermediate scheme, the storage area of the intermediate form data generated in the printer becomes larger than that the form data is stored in the form of PDL.

Also with the conventional intermediate scheme, since the memory capacity of form data can be known only after it is analyzed in the printer and converted into intermediate codes, the memory capacity in the printer cannot be managed, for example, by a host computer. Therefore, a memory over-capacity or the like may occur and the form data cannot be registered normally.

The conventional intermediate scheme processes an input image so as to make it easy to generate a rasterized image (for example, scalable fonts are stored after they are converted into a bit map image of a predetermined size). Therefore, if the already registered form data is enlarged or reduced, the image quality and process speed are lowered.

A printer capable of printing data on an A3 sheet, an A4 sheet can be printed either in the lateral direction or elevational direction. With the conventional intermediate code scheme, however, an input image is rotated in order to make it easy to generate a rasterized image so that the form data both in the lateral and elevational directions are required to be stored and the memory capacity increases.

In the case of a printer which can change an output resolution and is used with the conventional intermediate code scheme, since an input image is processed to make it easy to generate a rasterized image, it becomes necessary to store form data sets as many as the number of output resolutions and the memory capacity increases.

As above, with the conventional intermediate code scheme, it is necessary to prepare intermediate codes satisfying all the conditions of printing back matter data so that the memory capacity increases.

The invention has been made in consideration of the above problems and aims to provide an image processing apparatus and method capable of performing a form overlay process at high speed.

SUMMARY OF THE INVENTION

According to an embodiment of the present invention, there is provided a print control apparatus capable of communicating with a data generator source via a predetermined communication medium, comprising: first registration means for registering first print data of a first data format generated by the data generator source into a memory; second registration means for converting the first print data into second print data of a second data format and registering the second print data in the memory, the second print data being most suitable for outputting from a printing unit; data processing means for developing, in an overlay manner on the memory, print data of each page sequentially sent from the data generator source and the second print data stored in the memory to generate a print image; and control means for controlling an overlay print of the printing unit in accordance with the print image.

According to another embodiment of the present invention, there is provided a print control apparatus for receiving print data, generating image data from the print data, and outputting the image data to a printer, comprising: storage means for storing at least one set of form data; output means responsive to a presence of form data designation in the print data for reading the image data of the designated form data from a cache memory, synthesizing the read image data with the image data generated from the print data, and outputting a synthesized image data to the printer; cache means for registering the generated image data to the cache memory.

The other objects and features of the present invention will become apparent from the following detailed description of the embodiments when read in conjunction with the accompanying drawings.

DETAILED DESCRIPTION OF THE PREFERRED EMBODIMENTS

Prior to describing the structure of embodiments, the structure of a laser beam printer and an ink jet printer suitable for the application to the embodiments will be described with reference to FIGS. 1 to 3. Printers applicable to the embodiments are not limited only to the laser beam printer and ink jet printer, but other types of printers may obviously be used.

Figure 1:
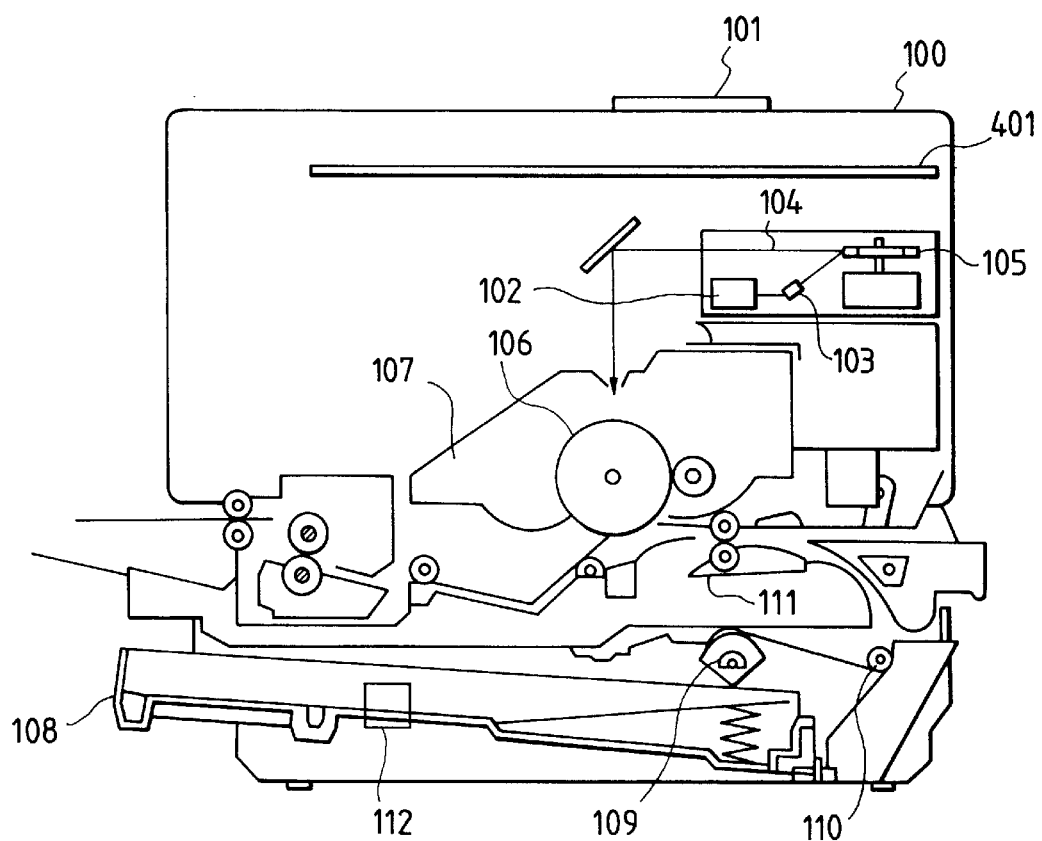
FIG. 1 is a cross sectional view of an example of a printer applicable to the present invention.

FIG. 1 is a cross sectional view showing the structure of one example of a printer applicable to the present invention, this printer being a laser beam printer (hereinafter described as LBP) by way of example.

In FIG. 1, reference numeral 100 represents a main body of a LBP which stores print information (such as character codes), form information, macro instructions and the like supplied from an external host computer, generates character patterns, form patterns and the like from the supplied information, and forms images on a recording medium such as a recording sheet.

Reference numeral 101 represents an operating unit provided with switches, LED displays and the like to be used for the operation of the laser beam printer. Reference numeral 401 represents a printer control unit for controlling the whole operations of LBP 100 and analyzing character information and the like supplied from the host computer. This printer control unit 401 mainly converts character information into video signals of character patterns and outputs it to a laser driver 102. The laser driver 102 drives a semiconductor laser 103 to turn on and off a laser beam 104 emitted from the semiconductor laser 103 in accordance with an input video signal. The laser beam 104 is deflected right and left by a rotary polygon mirror 105 to scan and expose an electrostatic drum 106.

An electrostatic latent image of a character pattern is therefore formed on the electrostatic drum 106. This latent image is developed with a developing unit 107 mounted at the periphery of the electrostatic drum 106 and transferred to a recording sheet. As the recording sheet, a cut sheet is used. Cut sheets are accommodated in a paper cassette 108 mounted on LBP 100 and transported by paper feed rollers 109 and transport rollers 110. A craw for indicating a cassette size is attached to the side panel of the paper cassette 108. A cassette size detector 112 as a craw detecting mechanism made of a general micro switch and mounted on LBP 100 detects the cassette type. The detected cassette type is informed via a printing unit interface 16 to be described later to the printer control unit 401.

LBP 100 has at least one or more unrepresented card slots so that an optional font card in addition to built-in fonts, a control card (emulation card) for different languages, or other cards can be connected.

Figure 2:
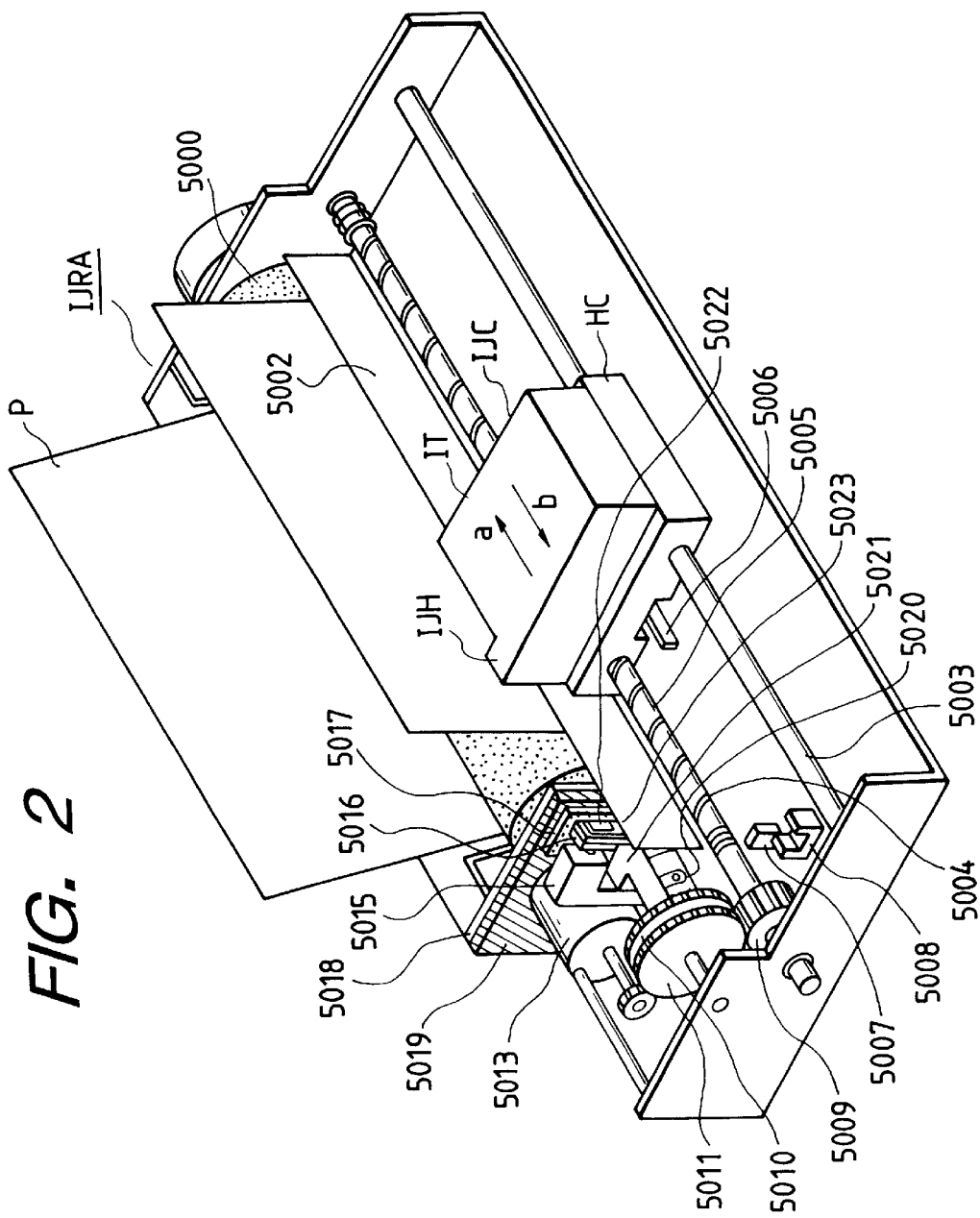
FIG. 2 is a cross sectional view of another example of a printer applicable to the present invention.

FIG. 2 is a cross sectional view showing the structure of another example of a printer applicable to the present invention, this printer being an ink jet recording apparatus (IJRA) by way of example.

In FIG. 2, a carriage HC having an unrepresented pin is reciprocally moved along a guide rail 5003 in arrow directions a and b. The carriage HC engages with a spiral groove 5004 of a lead screw 5005 which is rotated by drive force transmission gears 5011 and 5009 in response to a normal or reverse rotation of a driver motor 501. The carriage HC has an ink jet cartridge IJC mounted thereon, the cartridge IJC having an ink tank IT and an ink jet head IJH.

Reference numeral 5002 represents a paper pusher for pushing a sheet against a platen 5000 over the whole width in the carriage motion direction. Reference numerals 5007 and 5008 represent photocouplers which detect a presence of a lever 5006 of the carriage HC in this photocoupler area and functions as a home position detecting means for switching rotation directions or the like of the drive motor 5013. Reference numeral 5016 represents a support member for supporting a cap member 5022 for covering the front surface of a recording head. Reference numeral 5015 represents a suction means for sucking the inside of the cap member to perform a suction recovery of the recording head via an opening 5023 formed in the cap. Reference numeral 5017 represents a cleaning blade which is moved back and forth by a unit 5019. Reference numeral 5018 represents a main body support plate for supporting the cleaning blade 5017 and unit 5019. Reference numeral 5021 represents a lever for starting suction of the suction recovery. This lever 5021 is moved as a cam 5020 engaged with the carriage HC moves, so that a drive force of the driver motor 5013 is controlled by a known transmission means such as a clutch.

These capping, cleaning, and suction recovering are controlled to perform predetermined processes at their respective positions in response to the operation of the lead screw 5005 when the carriage HC is in the region on the home position side. Various other controls of these may be possible so long as such predetermined processes can be performed at desired timings.

Figure 3:
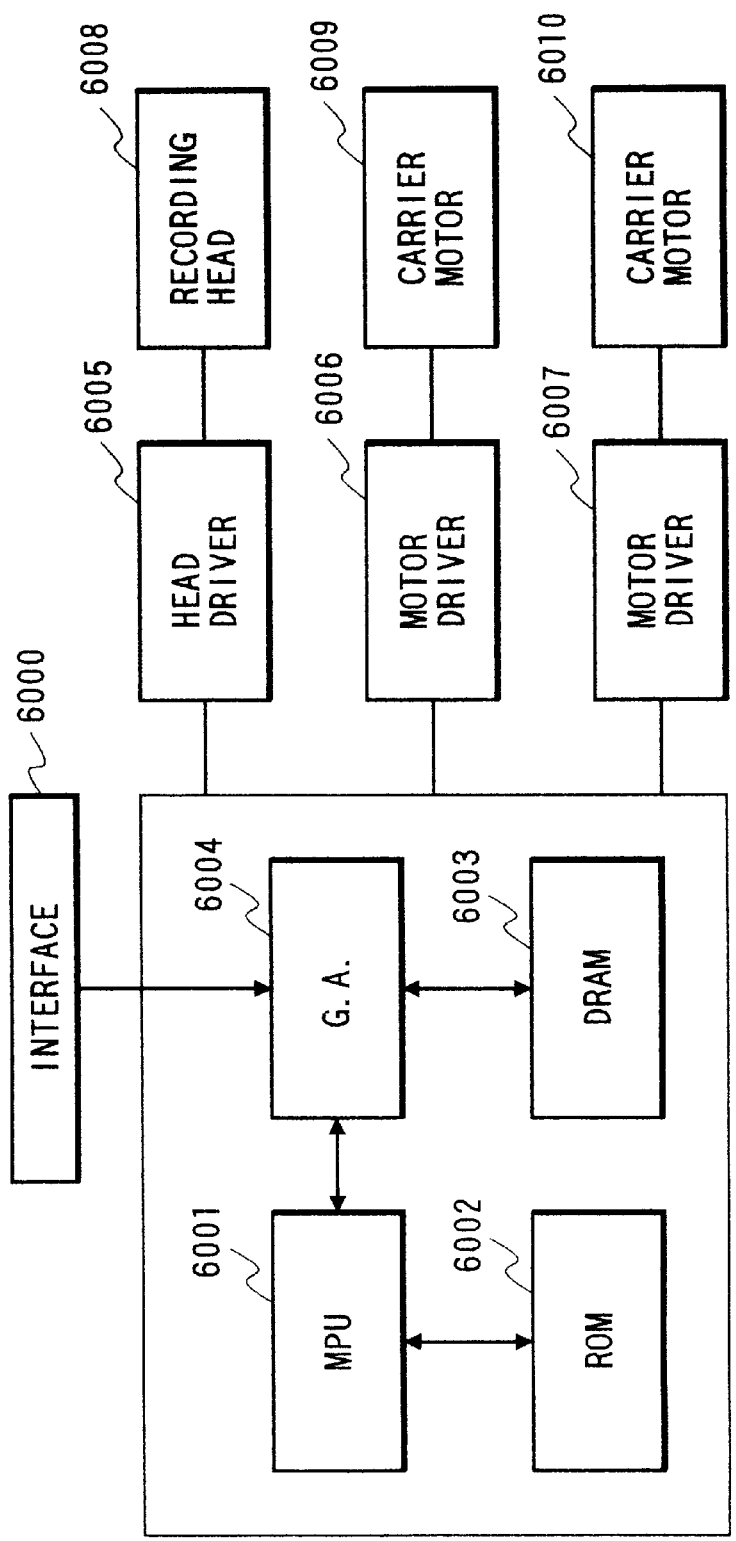
FIG. 3 is a block diagram illustrating the control operation of the printer shown in FIG. 2.

FIG. 3 is a block diagram illustrating the control of the printer shown in FIG. 2.

In FIG. 3, reference numeral 6000 represents an interface for the input of a recording signal. Reference numeral 6001 represents an MPU, reference numeral 6002 represents a ROM which stores control programs to be executed by MPU 6002, host print information and the like. Reference numeral 6003 represents a DRAM which stores various types of data (such as recording signals and record data to be supplied to the head). Reference numeral 6004 represents a gate array (G.A.) for the control of data supplied to a recording head 6008, and also for the transfer control of data among the interface 6000, MPU 6001 and DRAM 6003. Reference numeral 6010 represents a carrier motor for carrying the recording head 6008. Reference numeral 6009 represents a transport motor for transporting a recording sheet. Reference numeral 6005 represents a head driver for driving the recording head 6008. Reference numeral 6006 represents a motor driver for driving the transport motor 6009, and reference numeral 6007 represents a motor driver for driving the carrier motor 6010.

In the recording apparatus constructed as above, as input information is supplied via the interface 6000 from a host computer 400 to be described later, the input information is converted by the gate array 6004 and MPU 6001 into output print information. Then, the motor drivers 6006 and 6007 are activated and the recording head 6008 is driven in accordance with the output information supplied from the head driver 6005 to thereby print it out.

MPU 6001 can communicates with the host computer 400 via the interface 6000, and can supply the host computer 400 of memory information of DRAM 6003, resource data, host print information in ROM 6002, and the like.

First Embodiment

Figure 4:
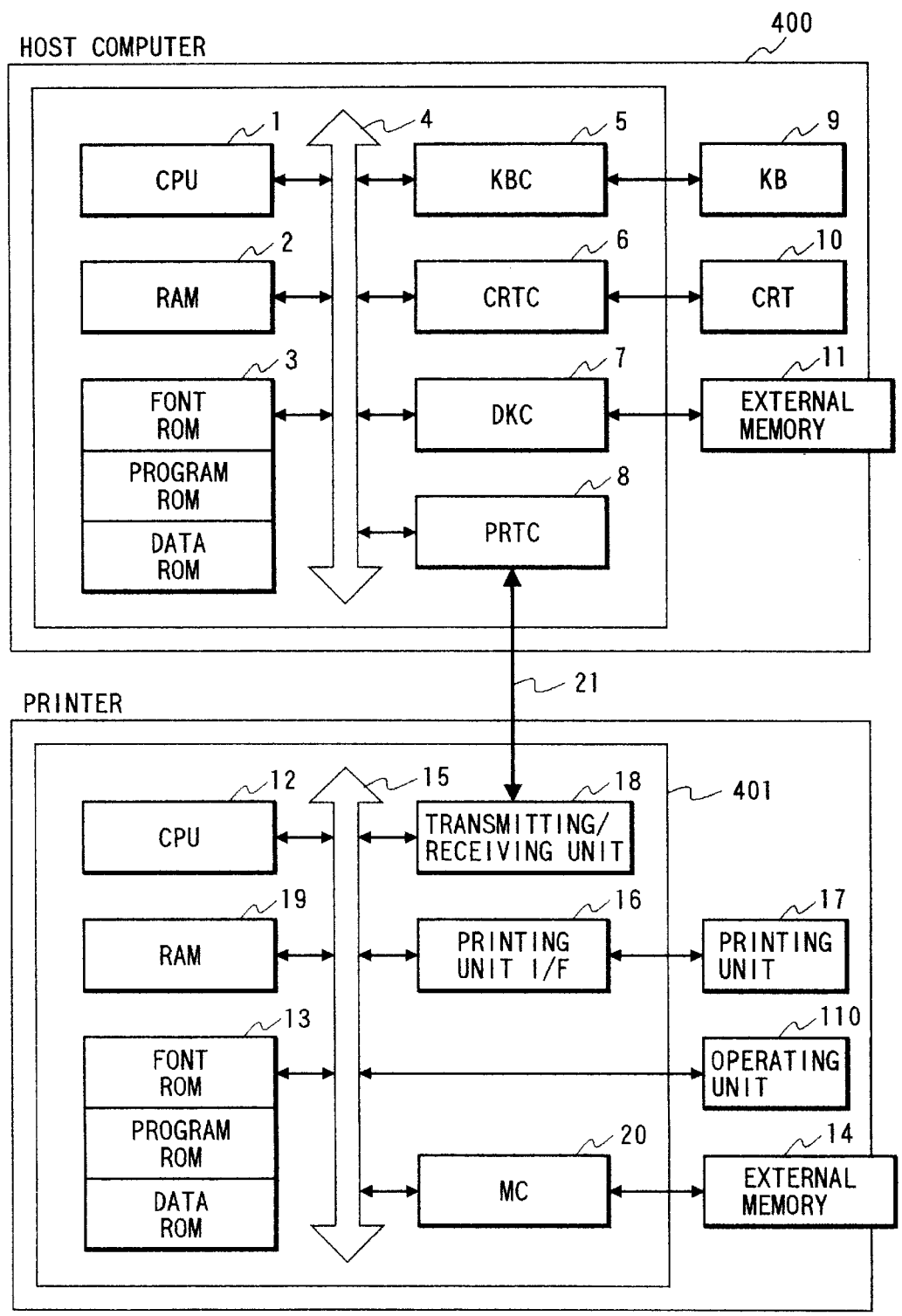
FIG. 4 is a block diagram illustrating the structure of a printer control system applicable to a print control apparatus according to a first embodiment of the invention.

FIG. 4 is a block diagram showing the structure of a printer control system which can be applied to a print control apparatus according to the first embodiment of the invention. In this embodiment, a laser printer (FIG. 1) is used by way of example. It is obvious that if the functions of the invention can be realized, the invention is applicable also to a single apparatus, a system constituted of a plurality of apparatuses, a system performing processes via a network such as a LAN, and the like.

In FIG. 4, reference numeral 400 represents the host computer which has a CPU 1 for executing information processing in accordance with an OS and an application program in RAM 2 loaded from an external memory 11 in accordance with a basic control program stored in a program ROM of a ROM 3. CPU 1 collectively controls each device connected to a system bus 4. For example, it processes a document mixed with figures, images, characters, tables (inclusive of spreadsheet calculation and the like) or the like in accordance with a document processing program or the like loaded in RAM 2.

The program ROM of ROM 3 stores, in addition to the basic control program of CPU 1, a frequently used document processing program and other programs. A font ROM of ROM 3 stores font data and the like to be used for the document processing. A data ROM of ROM 3 stores various data (such as character code conversion table and the like) to be used for the document processing or the like.

Reference numeral 2 represents a RAM which is used by CPU 1 as a main memory, a work area, an execution area for various programs loaded from the external memory 11, and the like. Reference numeral 5 represents a keyboard controller (KBC) which controls input from a keyboard (KB) 9 or an unrepresented pointing device. Reference numeral 6 represents a CRT controller (CRTC) which controls display of a CRT display (CRT) 10. Reference numeral 7 represents a disk controller (DKC) which controls an access to the external memory 11 including a floppy disk (FD) and a hard disk (HD) storing a boot program, various application programs, font data, user files, edited file or the like. Reference numeral 8 represents a print controller (PRTC) which is connected to a printer 100 via a predetermined bi-directional interface circuit and to an interface signal group 21 so as to perform a communication control process of the printer 100.

CPU 1 performs a development (rasterizing) process of developing outline fonts on a display information RAM, for example, set to RAM 2. It is therefore possible to achieve WYSIWYG on CRT 10. CPU 1 also performs various data processing by opening registered windows on CRT 10 in accordance with commands designated with an unrepresented mouse cursor or the like.

In the printer 100, reference numeral 401 represents the printer control unit of LBP 100 which has the following structure.

Reference numeral 12 represents a printer CPU which collectively controls various devices connected to a system bus 15, in accordance with a control program or the like stored in a program ROM of a ROM 13 or a control program or the like stored in an external memory 14, and outputs image signals as output information and various control signals such as a sheet request to a printing unit (printer engine) 17 connected via a printing unit interface 16. The printer CPU 12 is supplied via the printing unit interface 16 with control signals such as a timing signal for outputting an image signal from the printing unit 17 and a status signal representing a mounted paper cassette size or an absence of sheet.

Figure 9:
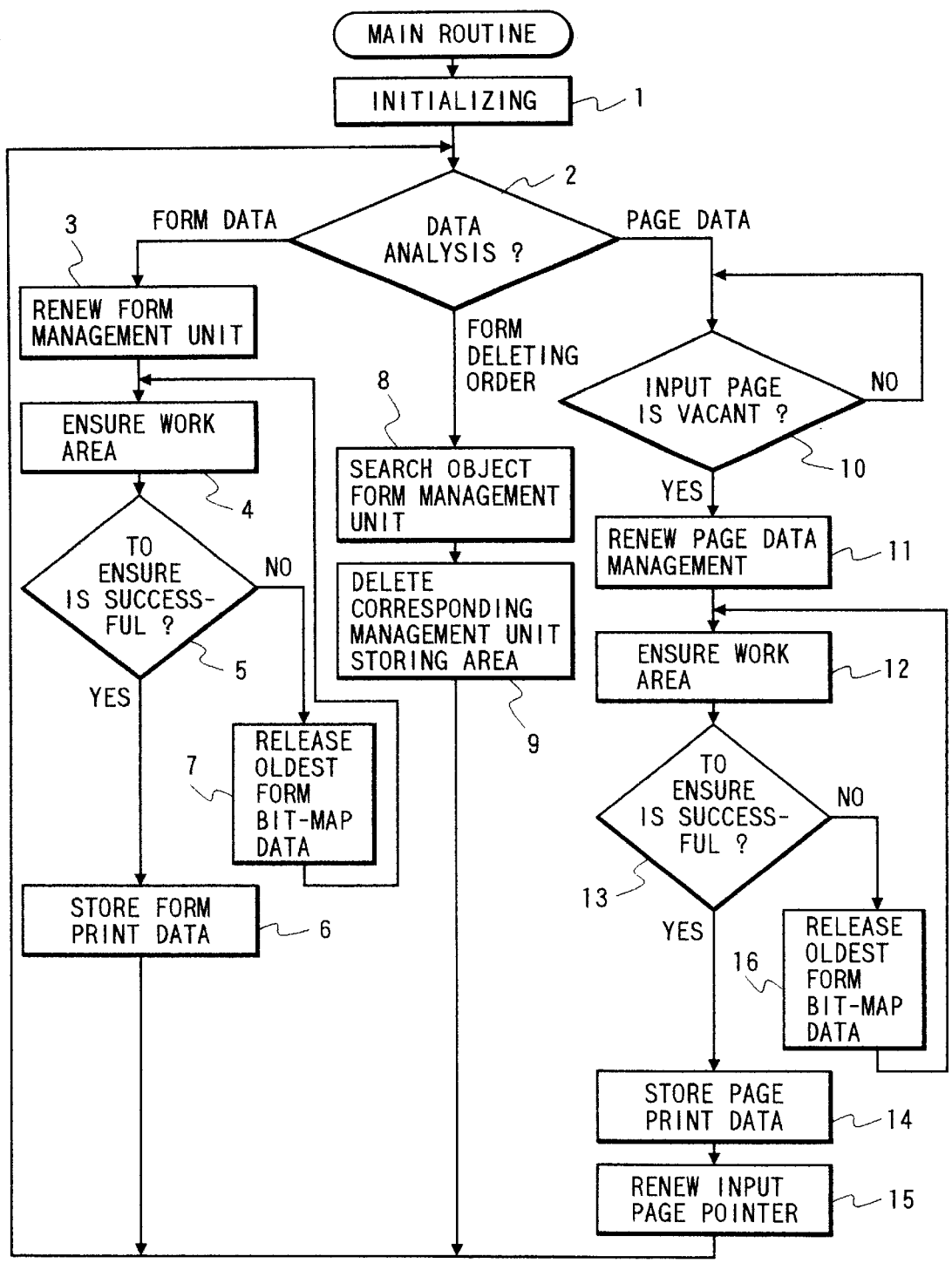
FIG. 9 is a flow chart illustrating a main routine of a printer control program of a print control apparatus of this invention.
Figure 10:
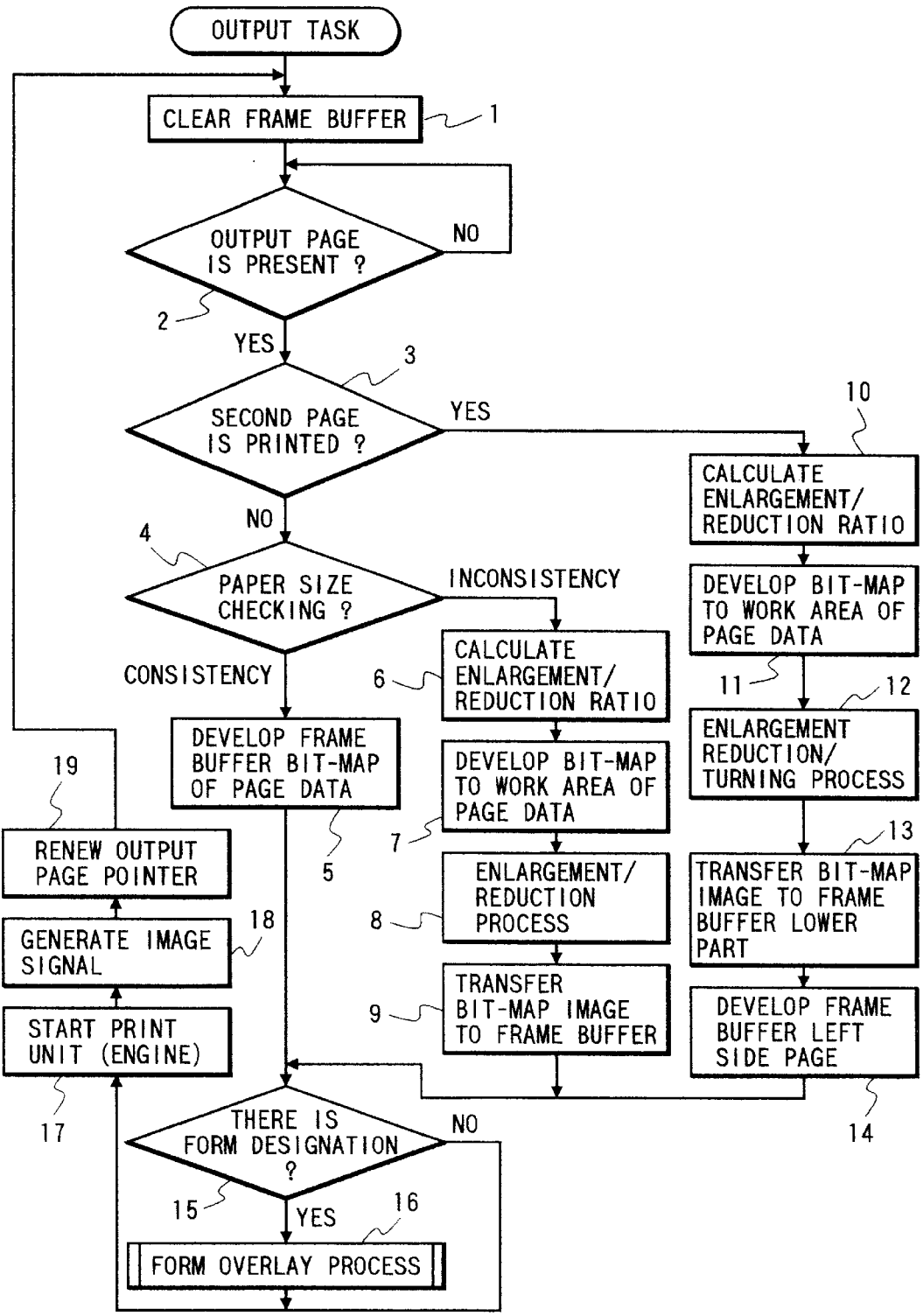
FIG. 10 is a flow chart illustrating an example of an output task which outputs and prints page data stored in the main routine shown in FIG. 9 together with form data.
Figure 11:
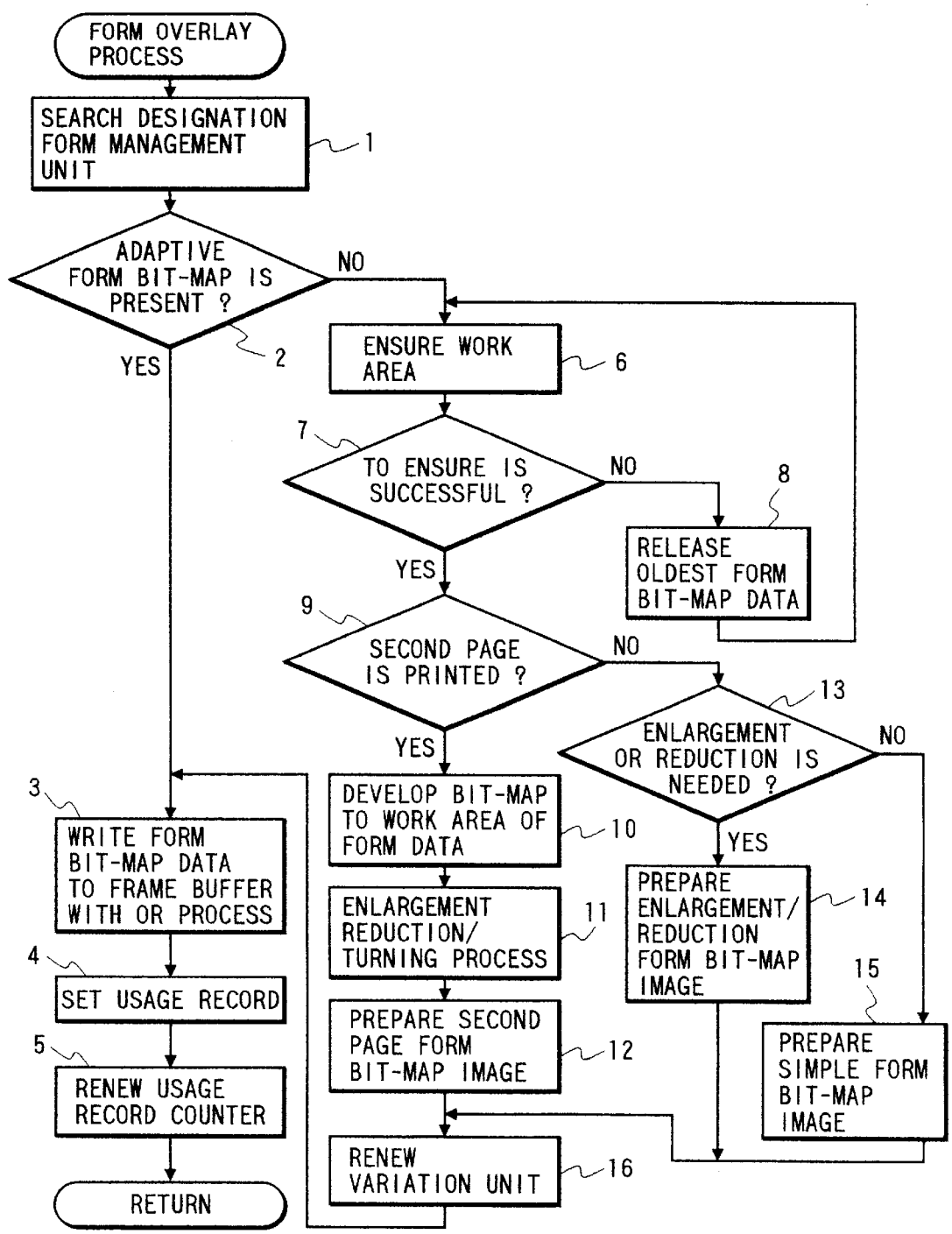
FIG. 11 is a flow chart illustrating an example of the detailed operation of a form overlay process routine shown in FIG. 10.

A program ROM of ROM 13 stores control programs and the like for CPU 12 such as shown in the flow charts of FIGS. 9 to 11. A font ROM of ROM 13 stores font data and the like to be used when the output information is generated. A data ROM of ROM 13 stores data such as form information to be used by the host computer if a printer which has no external memory 14 such as a hard disk is used. CPU 12 can communicate with the host computer 400 via a transmitting/receiving unit 18 so that information on the printer 100 or the like can be supplied to the host computer 400.

Reference numeral 19 represents a RAM functioning as a main memory and a work area of CPU 12, the memory capacity of RAM 19 capable of being increased by adding an optional RAM connected to an unrepresented extension port. RAM 19 is also used as a frame buffer 503 of the like shown in FIG. 5 to be later described.

The external memory 14 is an external storage means such as a hard disk and an IC card, and is controlled by a memory controller (MC) 20. The external memory 14 may be optionally connected so as to store fond data, emulation programs or the like.

Reference numeral 101 represents the operation panel (operating unit) described earlier which has switches, LED displays and the like for the operation of the printer. The external memory is not limited to only a single external memory, but may be provided at least one or more memories, such as a plurality of optional font cards in addition to built-in fonts and a plurality of external memories which stores programs for analyzing different printer control languages.

Figure 5:
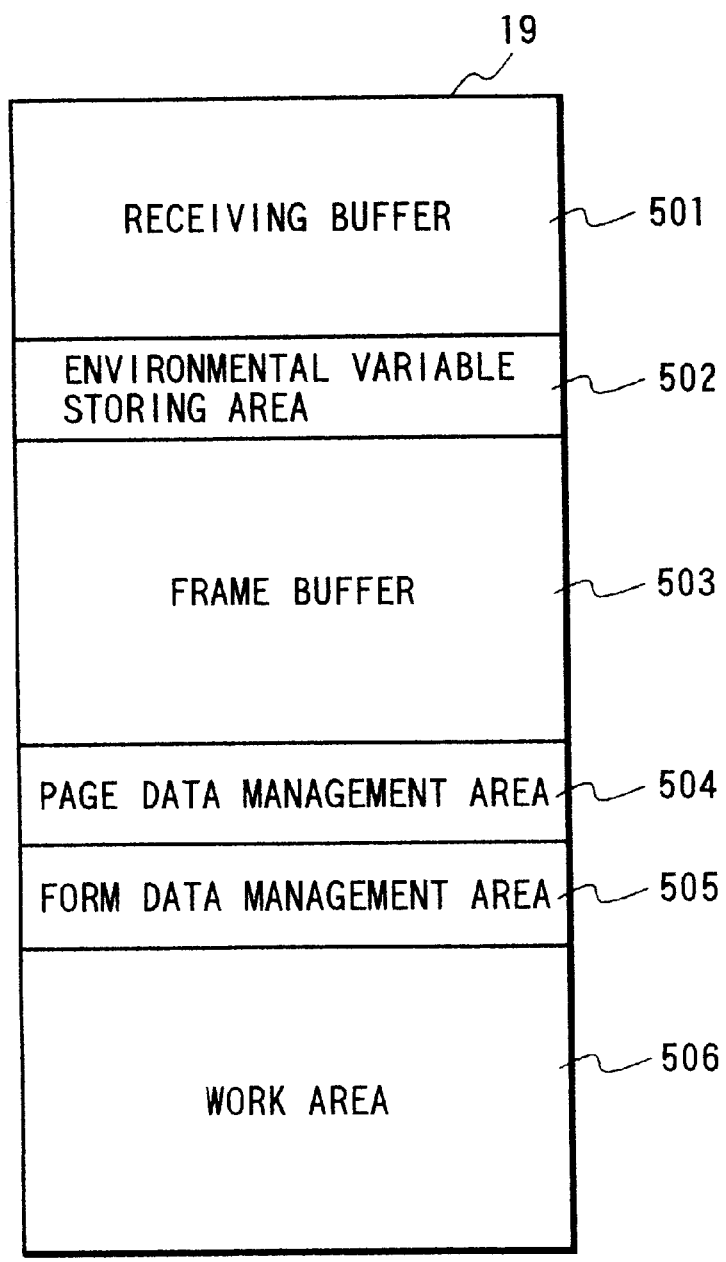
FIG. 5 is a diagram showing the internal data structure of RAM shown in FIG. 4.

FIG. 5 is a diagram showing the internal data structure of RAM 19 shown in FIG. 4. RAM 19 is mainly used for a receiving buffer 501, an environmental variable storing area 502, a frame buffer 503, a page data management area 504, a form data management area 505, a work area 506 and the like.

Of these areas, the receiving buffer 501 functions as an area for temporarily storing data supplied from the host computer 400 via the transmitting/receiving unit 18.

The frame buffer 503 is an area used for analyzing form data or page data of one page to develop it into a bit map image of one page and store it. As the bit map image of one page is completed, it is converted into an image signal in the unit of raster scan and sent via the printing unit interface 16 to the printing unit (printer engine) 17. The frame buffer 503 is retained as a rectangular area so as to make the memory mapping on RAM 19 coincide with the raster scan.

The page data management area 504 is an area used for analyzing data transmitted from the host computer 400, extracting and editing page data of each page, and storing the results in units of page, the details of which will be described later with reference to FIG. 7.

The form data management area 505 is an area used for analyzing data transmitted from the host computer 400, extracting and editing form data of each page to be registered, and storing the results in units of page, the details of which will be described later with reference to FIG. 8.

The work area 506 is an area temporarily used as a work area by a printer control program. A portion of this work area 506 is dynamically retained to store the entity of data edited and transmitted from the host computer, this entity being coupled by an address pointer to the page data management area 504 or form data management area 505.

Figure 6:
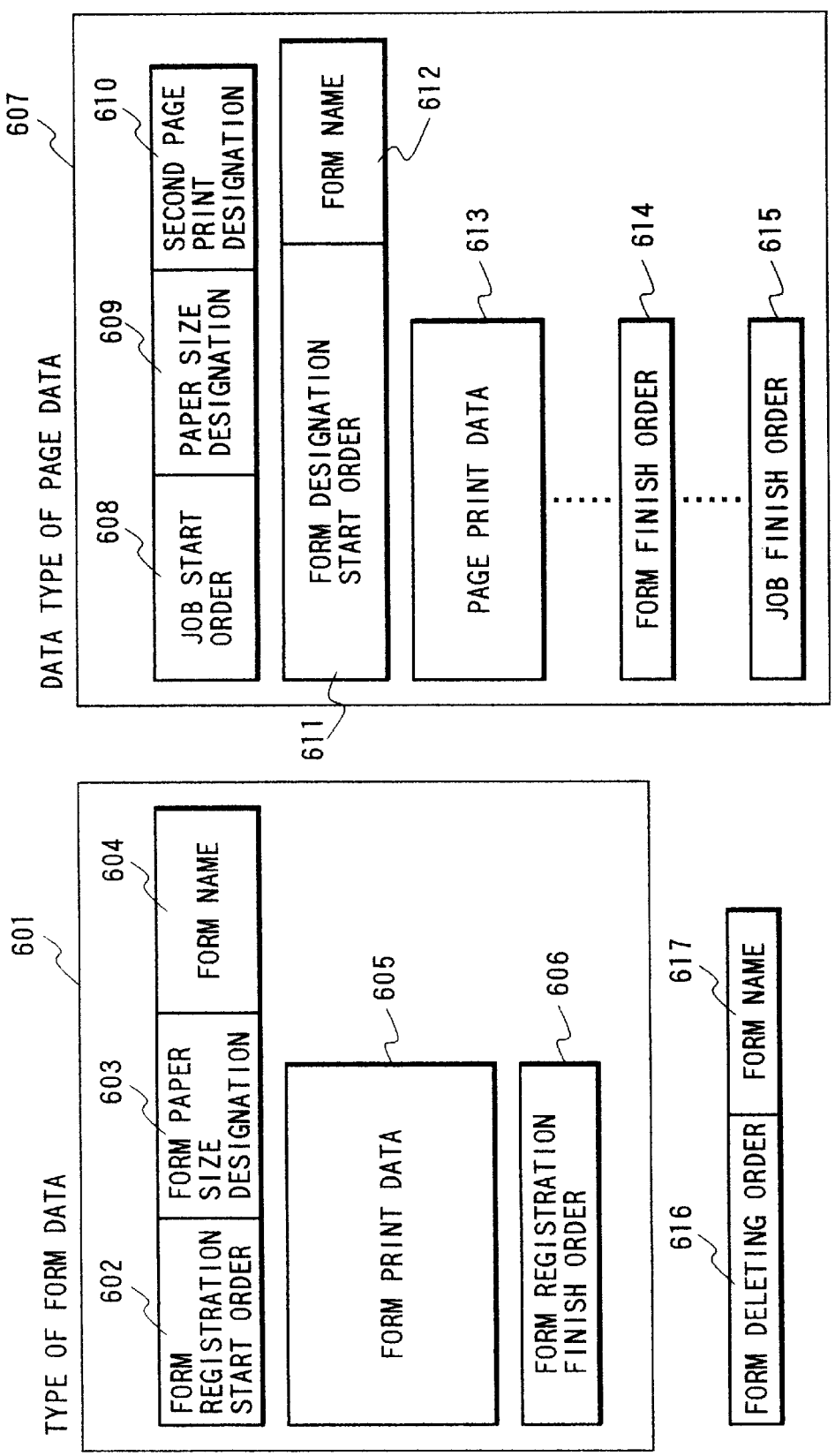
FIG. 6 is a diagram showing the data formats of page data and form data supplied from a host computer shown in FIG. 4.

FIG. 6 shows the formats of page data and form data supplied from the host computer 400 shown in FIG. 4.

In FIG. 6, reference numeral 601 indicates the format of form data which is constituted of form print data surrounded by form registration start order 603 and form registration finish order 606. The page data has also the same structure as the form print data 605, and is a combination of character codes, print position designations, character size designations, calligraphic style designations and line segment designations.

Given as parameters of the form registration start order 602 are form sheet size designation 603 and form name 604, the former defining the size of a sheet on which form data is printed, and the latter defining the name which definitely discriminates the registration form.

Reference numeral 607 indicates the format of page data which constitutes one print job of one data group with a plurality of pages surrounded by a job start order 608 and a job finish order 615.

Figure 16:
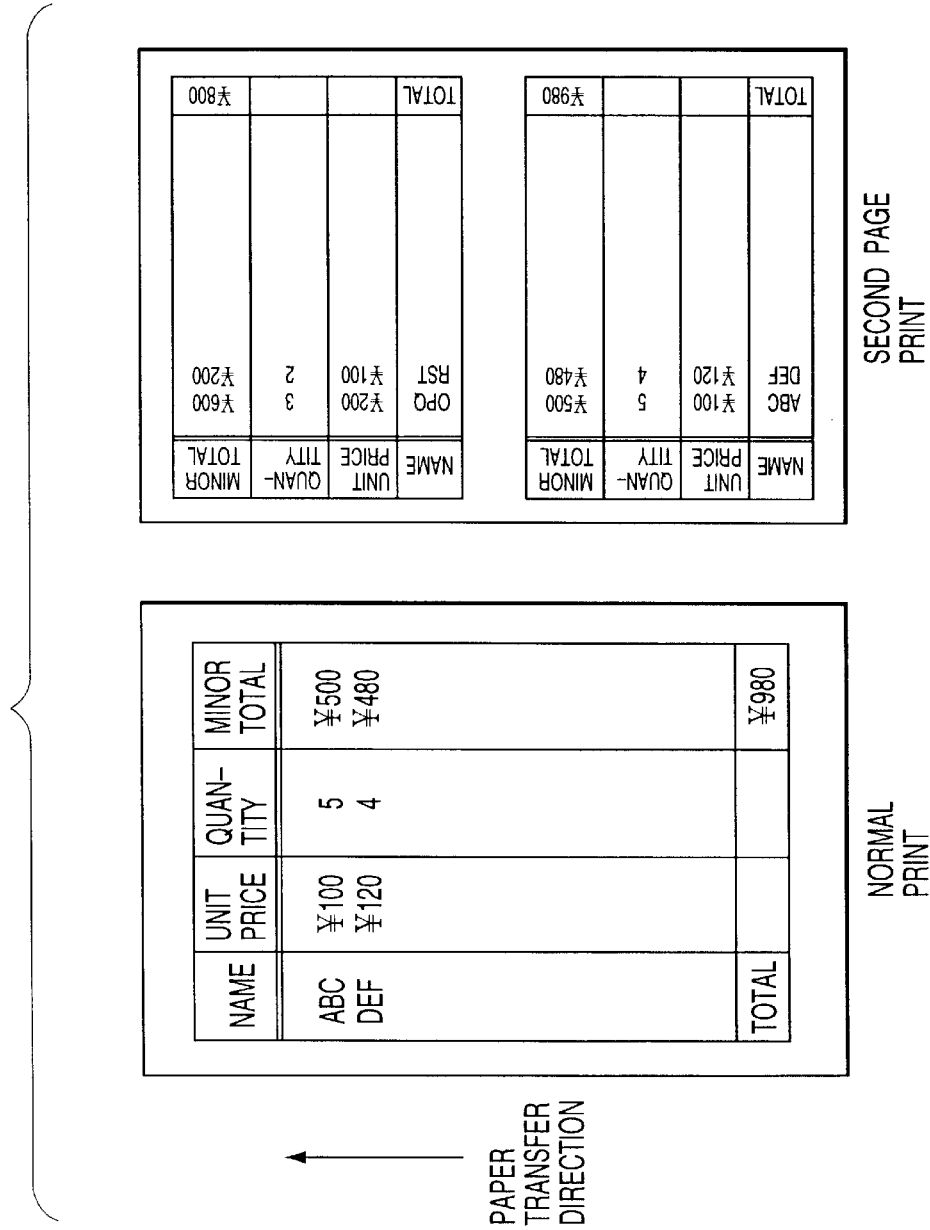
FIG. 16 is a schematic diagram illustrating print styles produced by a form overlay process of the print control apparatus.

Given as parameters of the job start order 608 are paper size designation 609 for designating a print paper size and two-page print designation 610 for designating an on/off of a reduced two-page print function (FIG. 16) for printing two pages on a single sheet. If the paper size designation 609 and the size of the paper cassette 108 actually mounted are different, print data is printed in an enlargement/reduction mode matching the size of the actually loaded sheet.

Reference numeral 611 represents a form designation start order which designates to print the form having the name designated by a form name 612 in an overlay manner on page print data 613 until a form finish order 614 is received.

The page print data 613 has the same structure as of form data, and is a combination of character codes, print position designations, character size designations, calligraphic style designations and line segment designations of one page. Until the form finish order 614 is received, the page print data of a plurality of pages is printed. Until the job finish order 615 is received, the form designation start order 611, print data of a plurality of pages 613 and form finish order 614 are repeated as necessary.

Reference numeral 616 represents a form deleting order for instructing to delete unnecessary registered forms. As a parameter of this order, a form name 617 indicating the name of a form to be deleted is given.

Figure 7:
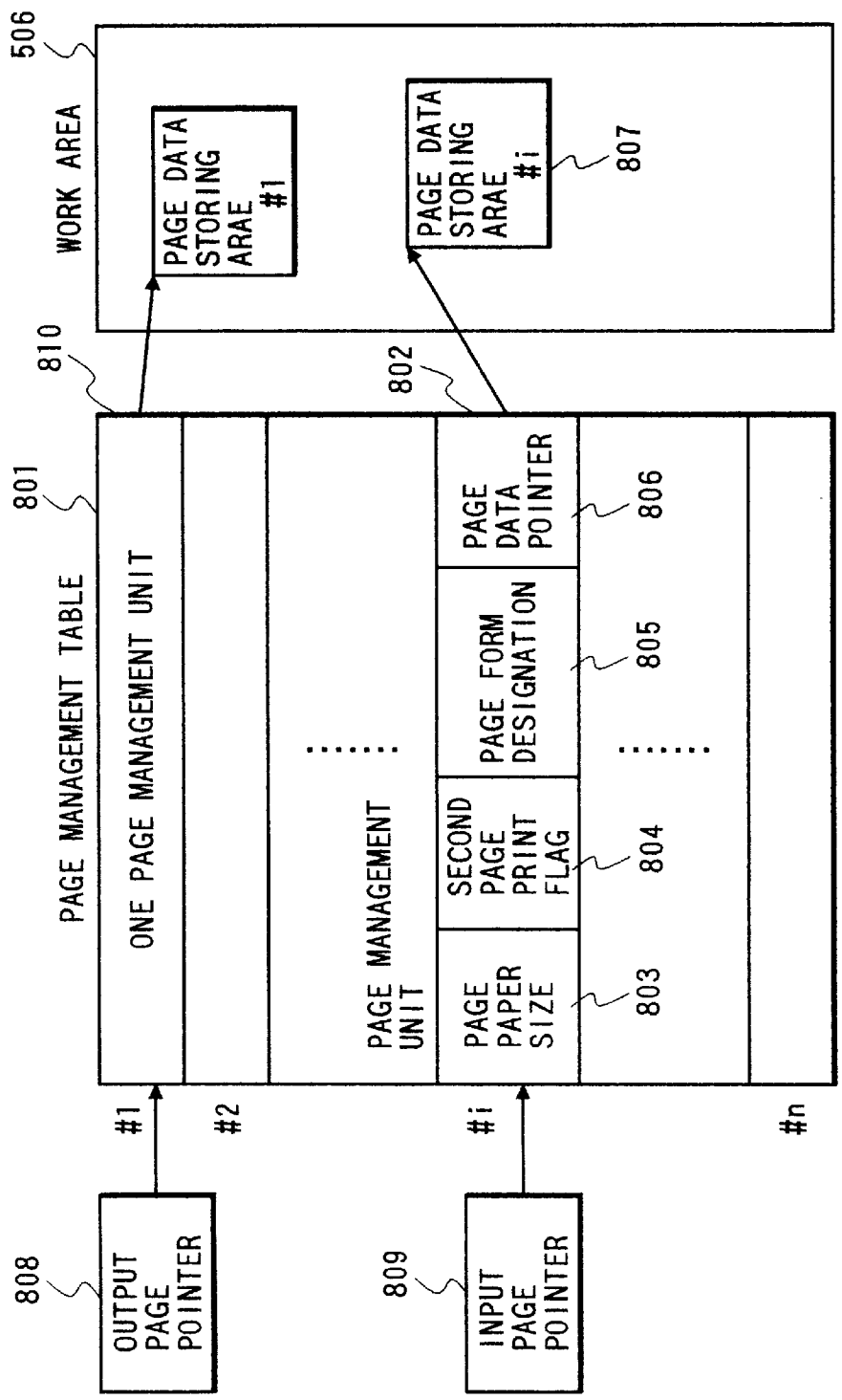
FIG. 7 is a diagram showing the internal data structure of a page data management area shown in FIG. 5.

FIG. 7 is a diagram showing the internal data structure of the page data management area 504 shown in FIG. 5. LBP 100 used in this embodiment adopts an electrophotographing print method. Therefore, if print starts once, the print operation cannot be temporarily stopped until one page is completely printed. It is therefore necessary to prepare print data of at least one page in the memory. Page data of a plurality of pages is stored in the memory and managed in order to perform continuous printing smoothly by performing in parallel both the processing of input data from the host computer 400 and the processing of image signal to be output to the printing unit (printer engine) 17.

In order to realize the above operations, the page data management area 504 has a page management table 801 constituted of a plurality of page management units 802 (#1, #2, . . . , #n). The page management unit 802 stores the analysis results of page data of each page in the page data format 607 supplied from the host computer 400. The analysis results of the paper size designation 609, two-page print designation 610 and form name 612 designated by the form designation start order 611 are reflected upon a paper size 803, a two-page print flag 804 and a page form designation 805.

The page print data 613 of one page is stored in a corresponding page data storage area 807 dynamically assigned in the work area 506 in accordance with the data amount, and a pointer indicating the storage area is recorded in a page data pointer 806 of the page management unit 802. Each page management unit 810 is designated by an output page pointer 808 in order to read output print data.

At the same time, another page management unit 802 is designated by an input page pointer 809 in order to write input data from the host computer 400. The output page pointer 808 is a pointer to the page management unit which deals with the data under printing or the data to be next printed. The input page pointer 809 is a pointer to the page management unit which deals with the data while it is input and with the data to be next input.

Figure 8:
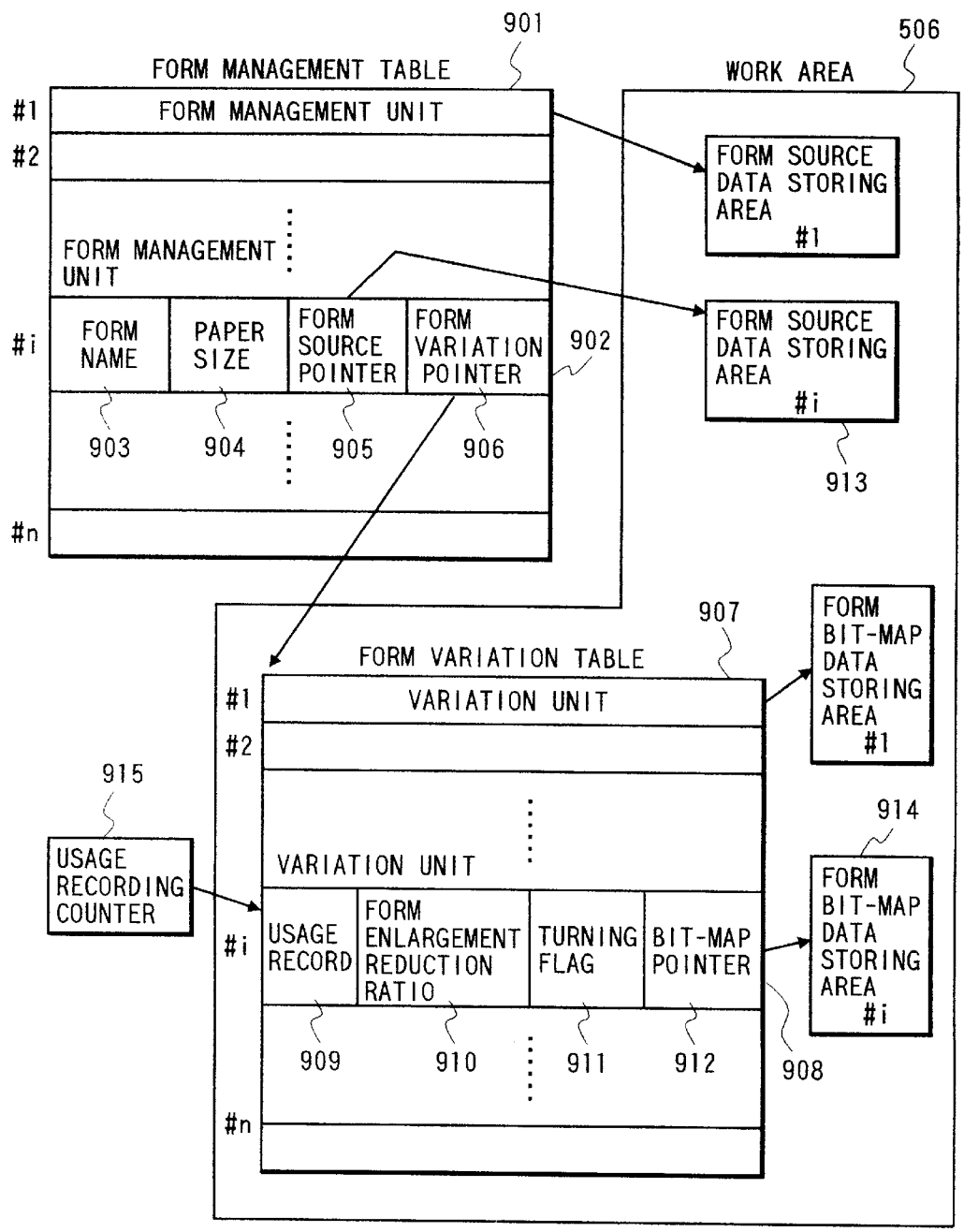
FIG. 8 is a diagram showing the internal data structure of a form data management area shown in FIG. 5.

FIG. 8 is a diagram showing the internal data structure of the form data management area 505 shown in FIG. 5. With this data structure, it becomes possible to manage form data of a plurality of forms supplied from the host computer 400 and registered in the data format 607 and search the desired form by using the form data management area 505 designated by the page data, to thereby allow a form overlay printing.

Reference numeral 901 represents a form management table which is the basic of form management and is constituted of a plurality of form management units 902 (#1, #2, . . . , #n) each corresponding to one form. The analysis results of input form data in the data format 607 are stored as the information of the following various forms. Reference numeral 903 represents the form name of this unit obtained from the form name 604. By using this form name as a search key, a desired form is searched.

Reference numeral 904 represents a paper size of the form of this unit obtained from the form paper size designation 603. The form print data 605 of one page is stored in a corresponding form source data storage area 913 dynamically assigned in the work area 506 in accordance with the data amount, and a pointer indicating the storage area is recorded in a form source pointer 905.

In printing the form data, the data stored in the form source data storage area 913 is rasterized and converted into a bit map image to be printed upon the page data. The bit map image of the form data is stored in a form bit map data storage area 914 dynamically assigned in the work area 506 in accordance with the data amount.

A form variation table 907 for managing the form bit map data storage area 914 is also dynamically assigned in the work area 506, and a pointer indicating the storage area is stored in a form variation pointer 905.

The form variation table 907 is a table for managing variations such as enlargement/reduction because of two-page print or printing for a different paper size and page image 90° rotation which occur when the form data is converted into bit map images. This table 907 has a plurality of variation units 908 (#1 , #2, . . . , #n) in corresponding to the number of variations, each unit having attribute information, management information and a pointer to the corresponding form bit map data storage area 914.

A usage record 909 is used for storing the information on when the form of this variation unit was used, and the value of a usage record counter 915 updated each time this usage record is set, is set when the form bit map data is used.

Therefore, this value of the usage record counter 915 can be used as an index of the oldest form bit map data to be deleted when the work area 506 becomes full. A form enlargement/reducing ratio 910 is calculated when the enlargement/reduction process is performed because of two-page print or printing for a different paper size.

A turning or rotation flag 911 is an index used when the form image is converted into bit map image data by rotating the form image by 90° by the two-page print function. A pointer to the corresponding form bit map data storage area 914 is stored in the bit map pointer 912.

In the printer control system constructed as above, the process of printing form data on page data in a form overlay manner will be described with reference to the flow charts shown in FIGS. 9 to 11. The printer control program is a multi-task processing program using a so-called real time monitor, and processes in parallel the main routine dealing with the input process and an output task, under the real time monitor management.

FIG. 9 is a flow chart illustrating an example of the main routine of the printer control program used with the print control apparatus of this invention. In FIG. 9, (1) to (16) represent each step.

At Step (1), the whole program is initialized. Next, at Step (2), the input data is read from the receiving buffer 501, and the input data is analyzed in conformity with FIG. 7. If the input data is judged as the form data, the flow advances to Step (3) whereat an empty form management unit 902 is renewed and the form name 903 and form paper size 904 obtained from the input data are set.

At Step (4), the work area 506 for storing the form print data 605 of one page is retained in RAM 19. Next, at Step (5) it is checked whether the work area 506 can be retained. If retained, the form print data 605 is stored and the pointer indicating the storage location is stored in the form source pointer 905 to resume the analysis of the next data.

If on the other hand it is judged at Step (5) that there is no necessary empty area in the work area 506, the flow advances to Step (7) whereat by referring to the form variation table 907, the oldest bit map form is searched by using the usage record 909 to clear the corresponding variation unit 908 and release the corresponding form bit map data storage area 914 to form an empty area in the work area 506. Thereafter, the flow returns back to Step (4) to retain the work area 506.

If it is judged at Step (2) that the input data is the form deleting order 616, the flow advances to Step (8) to perform a form deletion process.

At Step (8), the form name 903 of each unit of the form management table 901 which is coincident with the name 617 of the form to be deleted is searched, and at Step (9) the corresponding form management unit 902 and variation unit 908 are cleared to release the corresponding form source data storage area 913 and form bit map data storage area 924 of the work area 606. After the form deletion process is completed, the next data is analyzed at Step (2).

If on the other hand it is judged that the input data is page data, the process advances to a page data storage process at Step (10) and following Steps.

At Step (10), it is waited until the page management unit 802 indicated by the page pointer becomes empty, i.e., until the preceding page of the present page is completely printed. At Step (11) in accordance with the data format 607 of the input page data, the page management unit 802 indicated by the input page pointer is renewed.

Specifically, the analysis results of the paper size designation 609, two-page print designation 610 and form name designated by the form designation start order 611 are set in the page sheet size 803, two-page print flag 804 and page form designation 805.

Next, at Step (12) the page data storage area 807 for storing the page print data 613 of one page is retained in the work area 506. At Step (13) it is checked if the work area 506 can be retained. If retained, the page print data is stored at Step (14) and the pointer indicating the storage location is recorded in the page data pointer 806. At Step (15) the input page pointer 809 is renewed to the next unit to return to Step (2) and analyze the next data.

If it is judged at Step (13) that there is no empty area in the work area 506, the flow advances to Step (15) whereat like Step (7), the oldest bit map form is searched by using the usage record 909 and referring to the form variation table 907. The corresponding variation unit 908 is cleared and the corresponding form bit map data storage area 914 is released to form an empty area in the work area 506. Thereafter, the flow returns to Step (12) to retain the work area 506.

FIG. 10 is a flow chart illustrating an example of an output task for printing the page data stored at the main routine shown in FIG. 9 together with the form data. In FIG. 10, (1) to (19) represent each step.

At Step (1), the frame buffer 503 is cleared. Next, at Step (2), it is checked whether the page data is already prepared in the page management unit 802 indicated by the output page pointer 808. If not prepared, it is waited until the main routine prepares the data, whereas if prepared, the flow advances to Step (3) and following Steps to perform an output process in accordance with the information of the page management unit 802 indicated by the output page pointer 808.

At Step (3) the two-page print flag 804 is checked to judge whether there is a two-page print designation (the two-page print flag 804 being set). If not, it is checked whether the page sheet size 803 designated at Step (4) coincides with the actual size of the paper cassette 108. If coincident, the data in the page data storage area 807 indicated by the page data pointer 806 is developed into bit map data on the frame buffer 503 and thereafter the flow advances to Step (15).

If on the other hand it is judged that the page sheet size 803 designated at Step (4) is different from the actual size of the paper cassette 108, an enlargement/reducing ratio matching the actual paper size is calculated at Step (6). At Step (7), the data in the page data storage area 807 indicated by the page data pointer 806 is once developed into bit map data on the work area, and at Step (8) the developed data is enlarged/reduced at the calculated enlargement/reducing factor and copied to the frame buffer 503 at Step (9) to follow Step (15).

If it is judged at Step (3) as the two-page print designation, the flow enters a two-page print process at Step (1) and following Steps. In accordance with the designated page sheet size 803, the actual size of the paper cassette 108 and a two-page reduction ratio, an enlargement/reducing ratio of the page data is calculated. At Step (11) the data in the page data storage area 807 indicated by the page data pointer 806 is once developed into bit map data on the work area, and at Step (12) the developed data is enlarged/reduced at the calculated enlargement/reducing factor and copied at Step (13) to the frame buffer 503 in its lower area. At Step (14), the Steps (11) and (12) are performed for the next page (right page) and the resultant data is copied to the frame buffer 503 in its upper area to thereby complete a two-page print image on the frame buffer 503 to follow Step (15).

After the bit map image of the page data of each type is formed in the frame buffer 503 as in the above manner, the flow advances to Step (15) whereat it is checked whether the page form designation 805 is given. If given, a form overlay process (to be described later with FIG. 11) is called at Step (16) to superpose the form data upon the frame buffer 503.

Next, at Step (17) the printing unit (printer engine) 17 is activated. At Step (18) the bit map image on the frame buffer 503 is converted into image signals in units of raster scan and sent to the printing unit (printer engine) 17 via the printing unit interface 16 to thereby print the data. After the printing is completed, the output page pointer 808 is advanced to the next unit at Step (19) to return to Step (1) and perform the output process of the next page.

FIG. 11 is a flow chart illustrating an example of the details of the form overlay process routine shown in FIG. 10. In FIG. 11, (1) to (16) represent each step.

First at Step (1), the form management unit 902 having the designated form name is searched from the form management table 901. At Step (2) the form enlargement/reducing factor 910 and turning flag 911 in the form variation table 907 indicated by the form variation pointer 906 in the form management unit 902 are referred to thereby check whether there is data in the form bit map data storage region 914 which data matches the page data presently formed on the frame buffer 503. If it is judged that there is matching data, the data in the form bit map data storage area 914 can be used as it is. Therefore, the flow advances to Step (3) whereat the form bit map data is ORed and written in the frame buffer 503 shown in FIG. 5.

At Step (4) the present value of the usage record counter 915 is set to the usage record 909, and at Step (5) the usage record counter 915 is renewed to depart from this routine.

If it is judged at Step (2) that there is no data in the form bit map data storage area 914 which data matches the page data presently formed on the frame buffer 503, the bit map image is newly generated from the form data stored in the form source data storage area 913 indicated by the form source pointer 905. To this end, at Step (6) the form bit map data storage area 914 for storing the bit map image of the form is retained in the work area 506.

Next, at Step (7) if there is no necessary empty area in the work area 506, the flow advances to Step (8) whereat the oldest bit map form is searched by using the usage record 909 and referring to the form variation table 907. The corresponding variation unit 908 is cleared and the corresponding form bit map data storage area 914 is released to form an empty area in the work area 506. Thereafter, the flow returns to Step (6) to retain the work area 506.

If it is judged at Step (7) that the work area 506 is retained, the flow advances to Step (9) and following Steps. In order to generate the form bit map data having the print attribute coincident with the page data already generated on the frame buffer 503, first at Step (9) the two-page print flag 804 of the corresponding page is checked and if it indicates the two-page print, the two-page print process at Step (10) and following Steps is performed. At Step (10) the form data indicated by the form source pointer 905 is once developed into bit map image data on the work area 506. At Step (11) the developed bit map image data is enlarged/reduced at the enlargement/reducing factor calculated at the enlargement/reducing process of the page data at Step (10), further subjected to a 90° rotation process of the bit map image for the two-page print. At Step (12) the resultant data is copied to complete a new form bit map data storage area 914 of the right and left two-page image to follow Step (16).

If it is judged at Step (9) that it is not the two-page print, then it is next checked at Step (13) whether the page data was enlarged/reduced. If enlarged/reduced, the form data indicated by the form source pointer 905 is once developed into bit map image at Step (14) and is enlarged/reduced at the enlargement/reducing factor calculated at Step (10) of FIG. 10 to thereby complete a new form bit map data storage area 914 to follow Step (16).

If it is judged at Step (13) that the page data was not enlarged/reduced, the flow advances to Step (15) whereat the form data indicated by the form source pointer 905 is developed into simple bit map image on the work area 506 to thereby complete a new form bit map data storage area 914 to follow Step (16). At Step (16), a variation unit 908 is added to the form variation table 907 in correspondence with the newly formed form bit map data storage area 914, and the usage record 909, form enlargement/reducing factor 910, turning flag 911 and bit map pointer 912 are set to return to Step (3) whereat the form bit map data is superposed upon the frame buffer 503.

As described so far, source data approximate to the input form data is left and the image developed into a bit map is stored. When the bit map image is again used, the stored bit map image and page data are superposed. Therefore, at the second and following prints, the time required for developing the form data into bit map image can be dispensed with, thereby contributing in speeding up the print process. Furthermore, since the bit map image of each form for enlargement/reducing, two-page print or the like is stored, the print process can be speeded up for each of print styles.

For the generated bit map image of a form for enlargement/reducing, two-page print or the like, a usage record is stored in the usage record 909. If the work area 506 becomes insufficient, the bit map form is deleted starting from the oldest bit map form and the newer bit map forms are maintained. It is therefore possible to improve the use efficiency of the memory while the print process is speeded up as much as possible. Also in this case, even if the corresponding form bit map data storage area 914 is deleted, the form source bit map data can be recovered and reproduced.

According to this invention, second print data most suitable for print data can be converted from the already registered first print data as desired. Therefore, an overlay print flexibly dealing with a change in print style can be performed.

Further, CPU 12 controls the deletion of the second print data registered in RAM 19 and the restorage of the second data, in accordance with the usage state of RAM 19. Accordingly, it is possible to retain the storage area otherwise occupied by the second print data, in the work memory when proper, and to continue the print process while the limited memory resource is effectively utilized.

Still further, CPU 12 controls the deletion of the second print data registered in RAM 19 in accordance with a priority order determined by the usage history of the second print data. Accordingly, it is possible to retain the storage area otherwise occupied by the second print data having a low usage frequency, in the work memory when proper, and to continue the print process while the limited memory resource is effectively utilized, without deleting the second print data having a high usage frequency.

Still further, CPU 12 performs a predetermined image processing of the second print data stored in RAM 19 in accordance with the print style of print data of each page sequentially sent from the host computer 400, and registers again the processed second print data. Accordingly, the second print data most suitable for the print style of print data of each page can be formed freely and in a short time from the already registered first print data.

The second print data having the second data format is bit map image data. Therefore, development of the output image of the print data of each page in an overlay manner can be performed in a short time.

Second Embodiment

In the first embodiment, the bit map form data is directly stored in the form bit map data storage area 914. The bit map image may be compressed and stored in the form bit map data storage area 914 in order to reduce the occupied memory capacity. Although some time is required for an expansion process when an overlap with the page data is performed, the use efficiency of the work area can be improved considerably.

Since the form data can be stored as a combination of form data itself, bit map image, and compressed bit map image, the memory efficiency and print process speed change with each storage type.

This combination of storage types may be automatically selected in accordance with the state of optional memories (external memory 14 or the like) and the performance of CPU 12. The combination may be manually selected by using the operating unit 101.

Also in the first embodiment, if the work area 500 becomes insufficient, the data in the oldest form bit map data storage area 914 is deleted. This data may not be deleted but may be compressed to reduce the occupied memory capacity.

Since the form bit map image is not deleted but stored in the compressed form, it is not necessary to reproduce it from the form source data storage area 913 and so the print process speed can be improved.

Also in the first embodiment, in order to perform two-page print, enlargement/reduction or rotation, a form bit map image of an equal size is once generated in the work area 506, and then it is rotated, enlarged or reduced. Fonts of this printer may be replaced by scalable fonts (outline fonts) which base upon coordinate data, and stored in the font ROM of ROM 13 to layout and rasterize characters, ruled lines and the like through calculations of the coordinate data for the realization of rotation, enlargement and reduction. As compared to the enlargement or reduction realized by a thinning process or the like of the bit map image of an equal size, the quality of the final bit map image can be improved although the process is complicated.

Also in the first embodiment, raw form data (primary form data) and bit map image form data (secondary form data) are used to improve the print speed. Instead of the bit map image, an intermediate code type data structure may be incorporated which is easy to develop into bit map image. Intermediate codes may be prepared for each variation such as two-page print. The data structure of intermediate codes may include various drawing elements such as "position information and character code" and their cache fonts (scalable fonts developed into dot patterns), and "position information and line segment length". Although some time is required for the bit map development on the frame buffer 503, the memory efficiency becomes very high as compared with the bit map image. Conversion into intermediate codes may be changed with the total capacity of memories used. Both the memory efficiency and print speed can be satisfied if an aggregation of frequently used drawing elements is converted in advance into bit map image elements and cached.

If compressed bit map image data is used as the second print data of the second data format, the capacity of the memory resource occupied by the second print data can be minimized.

Further, if intermediate code data which is an aggregation of predetermined drawing elements is used as the second print data of the second data format, the capacity of the memory resource occupied by the second print data can be minimized.

In the first embodiment, the final bit map image is formed on the frame buffer 503 corresponding to one page. The invention is not limited thereto, but a stripe type band buffer may be used.

Third Embodiment

Figure 12:
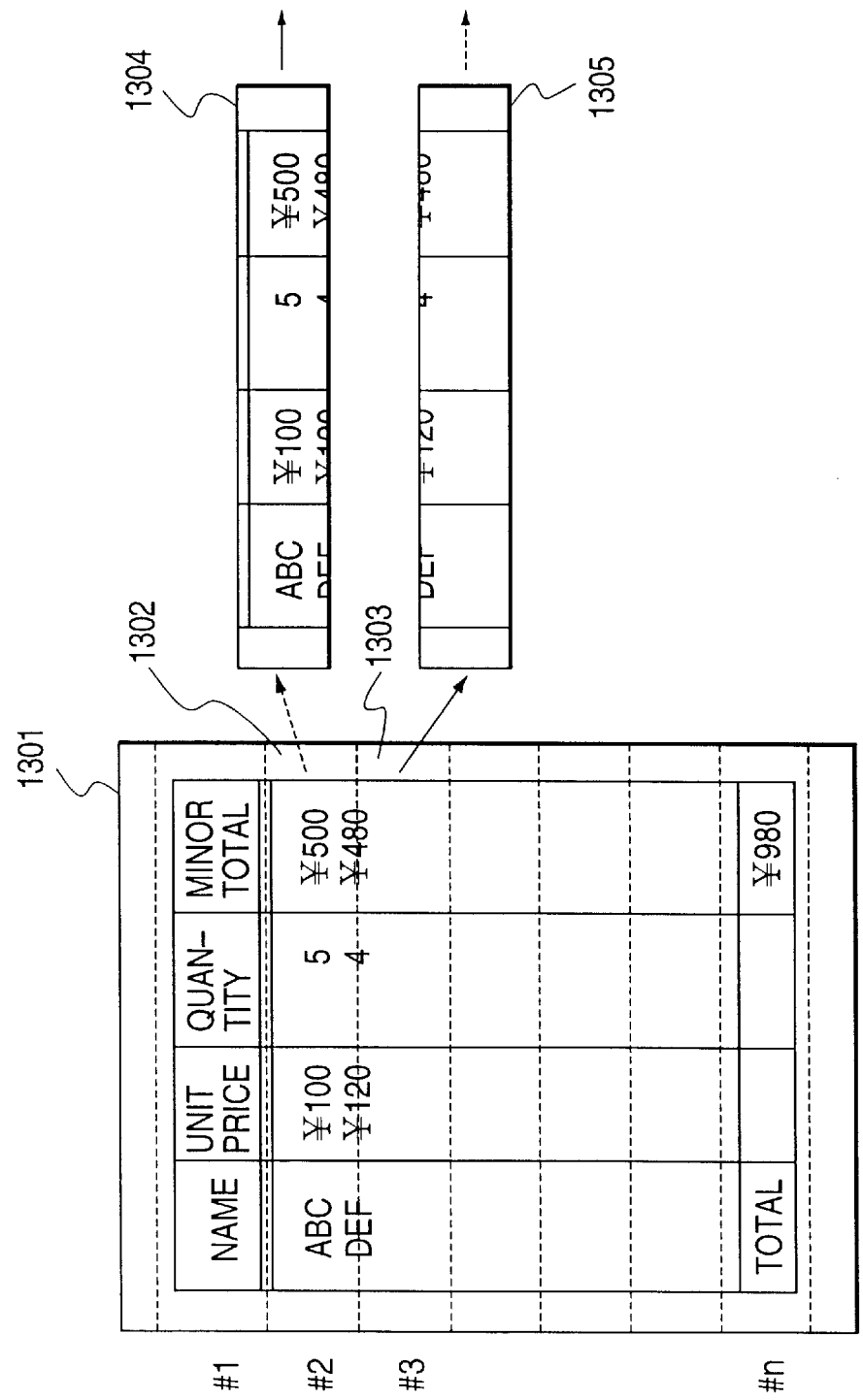
FIG. 12 is a schematic diagram illustrating a final bit map image development process to be performed at a band buffer retained in RAM shown in FIG. 4.

For example, as shown in FIG. 12, each band buffer corresponds to one block of a plurality of band-areas (stripe areas) divided from one-page bit map image. Band buffers are used as a double buffer (1304, 1305). Input data 1301 supplied from the host is edited in units of band. Data of one band 1302 is rasterized to form a bit map image of one band in the band buffer 1304. Thereafter, the bit map image is converted into an image signal in units of raster scan to supply it to the printing unit (printer engine) 17 via the printing unit interface 16. In parallel to the conversion of the data in the band buffer 1304, rasterizing of the next band 1303 starts to from the next one band bit map image in the band buffer 1305. The above operations are repeated to complete one page print. In this case, the form bit map data storage area 914 is also divided in units of band to thereby sequentially output data to the band buffer.

Since the band buffer is used in place of the frame buffer, the memory capacity can be saved. considerably. Further, while the image signal of the last band of a print page is sent, the image of the start band of the next page can be stored in another band buffer. The print operation can therefore be made smooth.

Figure 13:
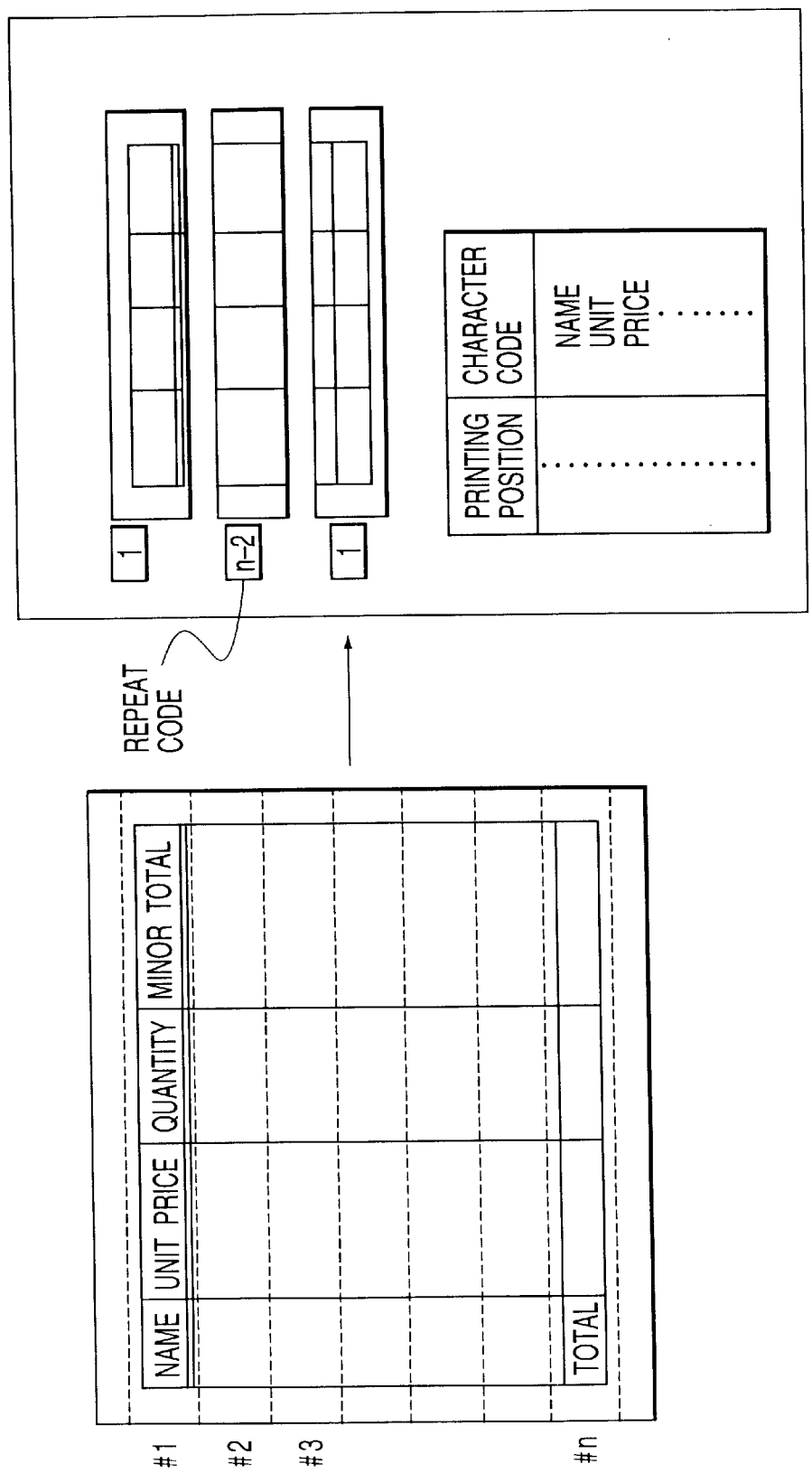
FIG. 13 is a diagram showing an example of a form bit map data storage area retained in RAM shown in FIG. 4.

As shown in FIG. 13, in each form bit map data storage area 914 divided into each band, the image of each band may be compressed or the band of the same image may be processed by using only a repetition signal. In this manner, the memory capacity can be further saved.

If character codes are rasterized when they are written into the band buffer, the memory efficiency becomes high. Therefore, each character code may be managed by extracting it together with position information.

The bit map image may be replaced by intermediate codes similar to the second embodiment.

As above, second print data most suitable for print data can be converted from the already registered first print data as desired. Therefore, an overlay print flexibly dealing with a change in print style can be performed.

Further, the second print data is registered in the memory in units of band of a stripe shape divided from the page developing area of RAM 19. Therefore, second print data most suitable for print data can be converted from the already registered first print data as desired. CPU 12 can efficiently perform an overlay print flexibly dealing with a change in print style, by using a small memory capacity.

Still further, in registering the second print data in the memory in units of band of a stripe shape divided from the page developing area of the memory, a plurality set of same second print data in respective bands are collectively registered in the memory. Therefore, CPU 12 can use the storage area which is otherwise occupied by the second print data, as a work area, and can continue the print process while efficiently using the limited memory resource.

Fourth Embodiment

In the third embodiment, although LBP 100 performs band compression and character code group extraction on the form bit map data storage area 914, these may be executed by the host computer 400. Specifically, after the host computer 400 generates form data, it converts the form data into bit map image in units of band and compresses it, by using the resources (CPU 1, RAM 2, ROM 3) of the host computer 400. The host computer 400 extracts the character code group as well as position information and sends them together with the form data (source data) to LBP 100 to be stored in the form source data storage area 913 and form bit map data storage area 914.

LBP 100 side performs only reproducing the data in the form bit map data storage area 914 once deleted because of no empty work area. Since the loads can be distributed to the host computer 400 and printer 100, the print speed can be improved.

With bi-directional communications, information (empty memory state, request for two-page print or enlargement/reduction, CPU performance) of the printer 100 can be sent to the host computer 400, and in accordance with the received information, the host computer 400 can change the levels of compression and character code extraction, can transmit only the source data, or can control the number of variations of bit map images to be supplied to the printer 100.

The band compression and character code group extraction on the form bit map data storage area 914 may be manually executed selectively on the printer 100 side or on the host computer 400 side.

As above, an overlay print with the print data of each input page can be performed efficiently, without giving too much data processing load on the printer side while the second print data necessary for the overlay print is registered in the printer side.

Further, the second print data can be converted into a most suitable format matching the data processing load of the printer. Therefore, the data processing resources of both the printer and the data generator source can be utilized together to efficiently perform an overlay print with the print data of each input page.

The structure of data processing programs readable by a printer system applicable to the print control apparatus of this invention will be described with reference to the memory map shown in FIG. 14.

Figure 14:
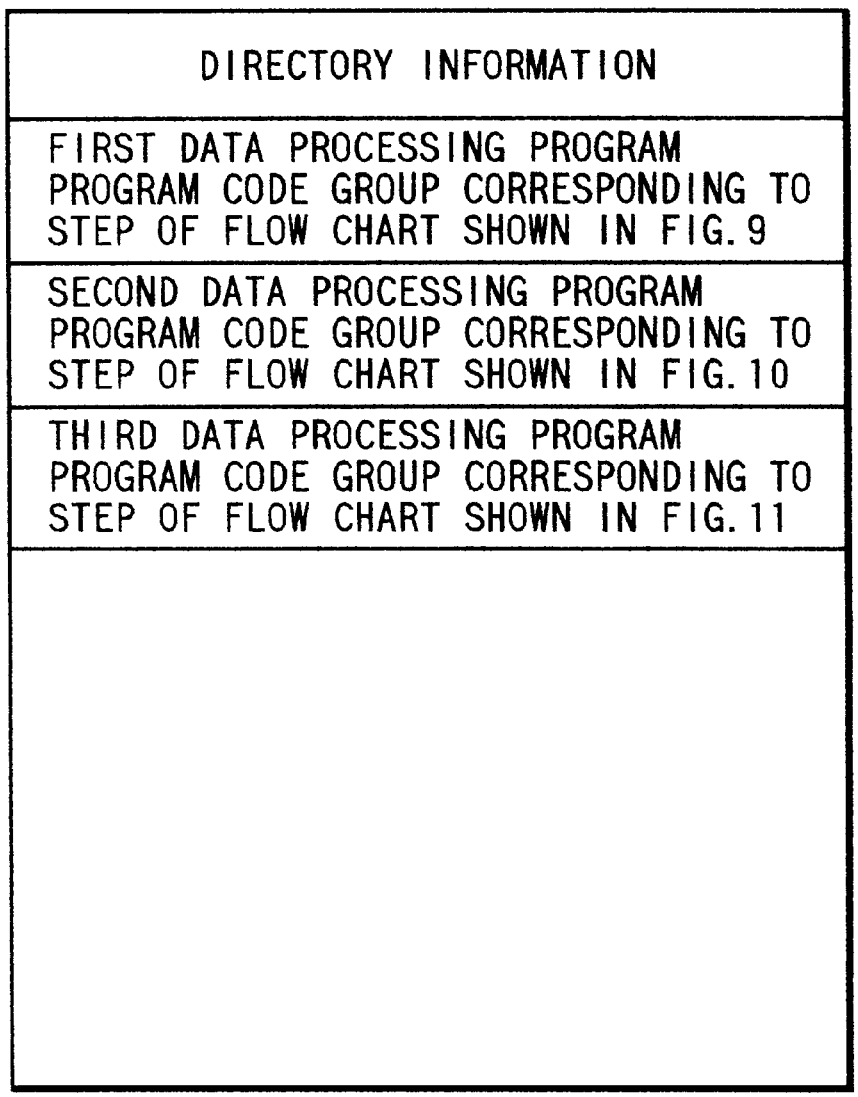
FIG. 14 is a memory map of a storage medium for storing various data processing programs which can be read by a print system applicable to a print control apparatus of the invention.
Figure 15:
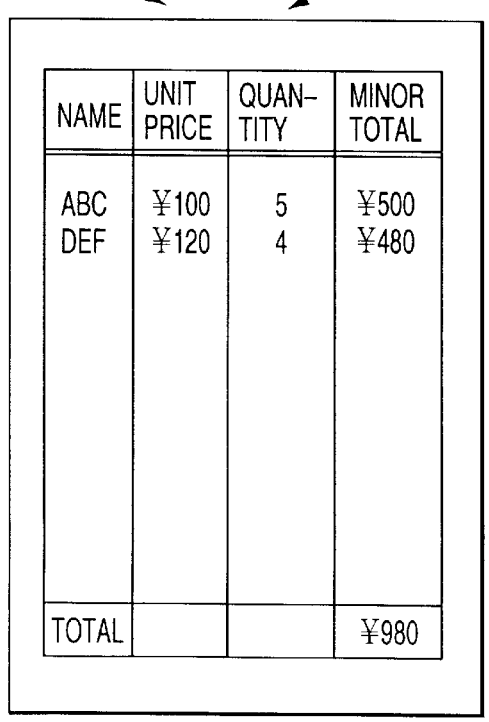
FIG. 15 is a schematic diagram illustrating a form overlay processing state of the print control apparatus.

FIG. 14 shows a memory map of a storage medium storing various data processing programs readable by a print system applicable to the print control apparatus of this invention.

Although not particularly shown in FIG. 14, this memory map may include information for managing the program group stored in the storage medium, such as version information, a producer name and the like, and information depending upon an OS or the like of the site from which programs are read, such as an icon for displaying a program discriminately.

Data belonging to each program is also managed by directories. The memory map may also include a program for installing a computer with various programs and a program for decompressing a compressed install program.

The functions illustrated with FIGS. 9, 10 and 11 of the above embodiment may be performed by the host computer by using an externally installed program. In this case, the invention is applicable to the case wherein information inclusive of programs is supplied to the output device from a storage medium such as CD-ROM, flash memory and FD or from an external storage medium via a network.

It is obvious that the objects of the invention can be achieved also in the case where a system or apparatus is supplied with a storage medium storing program codes of software realizing the functions of the above embodiments and the computer (CPU, MPU) of the system or apparatus reads and executes the program codes stored in the storage medium.

In this case, the program codes themselves read from the storage medium realize the novel functions of the invention. Therefore, the storage medium storing the program codes constitutes the present invention.

The storage medium storing such program codes may be a floppy disk, a hard disk, an optical disk, a magnetooptical disk, a CD-ROM, a magnetic tape, a non-volatile memory card, a ROM, and an EEPROM.

Obviously, the invention covers other modifications not only for the case wherein the embodiment functions are realized by executing the program codes read by the computer but also for the case wherein the embodiment functions are realized by performing part or the whole of the actual processes in accordance with the program codes by an OS (operating system) or the like on which the computer runs.

Furthermore, the scope of the invention also includes obviously the case wherein in accordance with the program codes stored in a memory of a function expansion board or unit connected to the computer supplied with the program codes read from the storage medium, a CPU or the like of the function board or unit executes part or the whole of the actual tasks for realizing the embodiment functions.

As described above, first, second print data most suitable for print data can be converted from the already registered first print data as desired. Therefore, an overlay print flexibly dealing with a change in print style can be performed.

Further, by controlling the deletion or re-registration of the second print data registered in the memory in accordance with the memory usage state, the storage area which is otherwise occupied by the second print data can be retained as a work area, and the print process can be continued while efficiently using the limited memory resource.

Still further, by deleting the second print data registered in the memory in accordance with the memory usage state, in accordance with a priority order basing upon a usage history, the storage area which is otherwise occupied by the frequently used second print data can be retained as a work area, and the print process can be continued while efficiently using the limited memory resource.

Still further, by re-registering deleting the second print data registered in the memory in accordance with the memory usage state, in accordance with a priority order basing upon a usage history, the storage area which is otherwise occupied by the frequently used second print data can be retained as a work area, and the print process can be continued while efficiently using the limited memory resource.

Still further, by performing a predetermined image processing of the second print data registered in the memory in accordance with the print style of print data of each page sequentially sent from the data generator source and reregistering the processed second print data, the second print data most suitable for the print style of the print data of each page can be generated from the already registered first print data in a desired manner and in a short time.

Still further, if the second print data of the second data format is bit map image data, an overlap development with the output image of the print data of each page can be performed in a short time.

Still further, if the second print data of the second data format is compressed map image data, the memory capacity occupied by the second print data can be minimized.

Still further, if the second print data of the second data format is intermediate code group data, the memory capacity occupied by the second print data can be minimized.

Still further, by registering the second print data in the memory in units of band of a stripe shape divided from the page developing area of the memory, the second print data most suitable for print data can be converted from the already registered first print data so that an overlay print flexibly dealing with a change in the print style can be efficiently performed with a small memory capacity.

Still further, in registering the second print data in the memory in units of band of a stripe shape divided from the page developing area of the memory, by registering a plurality set of same second print data in respective bands collectively in the memory, it becomes possible to use the storage area which is otherwise occupied by the second print data, as a work area, and continue the print process while efficiently using the limited memory resource.

Still further, the level of converting the second print data of the second data format suitable for outputting from the printing unit of the printer in accordance with the generated first print data of the first data format, is variably controlled by the resource information. Therefore, the second print data can be converted into a most suitable format matching the data processing load of the printer, and the data processing resources of both the printer and the data generator source can be utilized together to efficiently perform an overlay print with the print data of each input page.

Still further, the first print data of the first data format generated by the data generator source is stored in the memory, the second print data registered in the memory is deleted in accordance with the judgement results of the memory usage state to retain an empty area, and after the data is deleted, the first print data is converted into the second print data of the second data format most suitable for outputting from the printing unit to store the second print data in the memory. It is therefore possible to generate the second print data most suitable for print data from the already registered first print data as desired and to perform an overlay print flexibly dealing with a change in the print style.

Still further, a predetermined image processing of the second print data registered in the memory is performed in accordance with the print style of print data of each page sequentially sent from the data generator source and the processed second print data is re-registered. Therefore, the second print data most suitable for the print style of the print data of each page can be generated from the already registered first print data in a desired manner and in a short time.

Accordingly, even if the print style of the print data of each input page changes, the most suitable second print data can be generated in a short time without giving a load on the memory resources, the print process time required for formatted print data such as a form can be shortened, and a desired overlay print can be performed efficiently.

Figure 17:
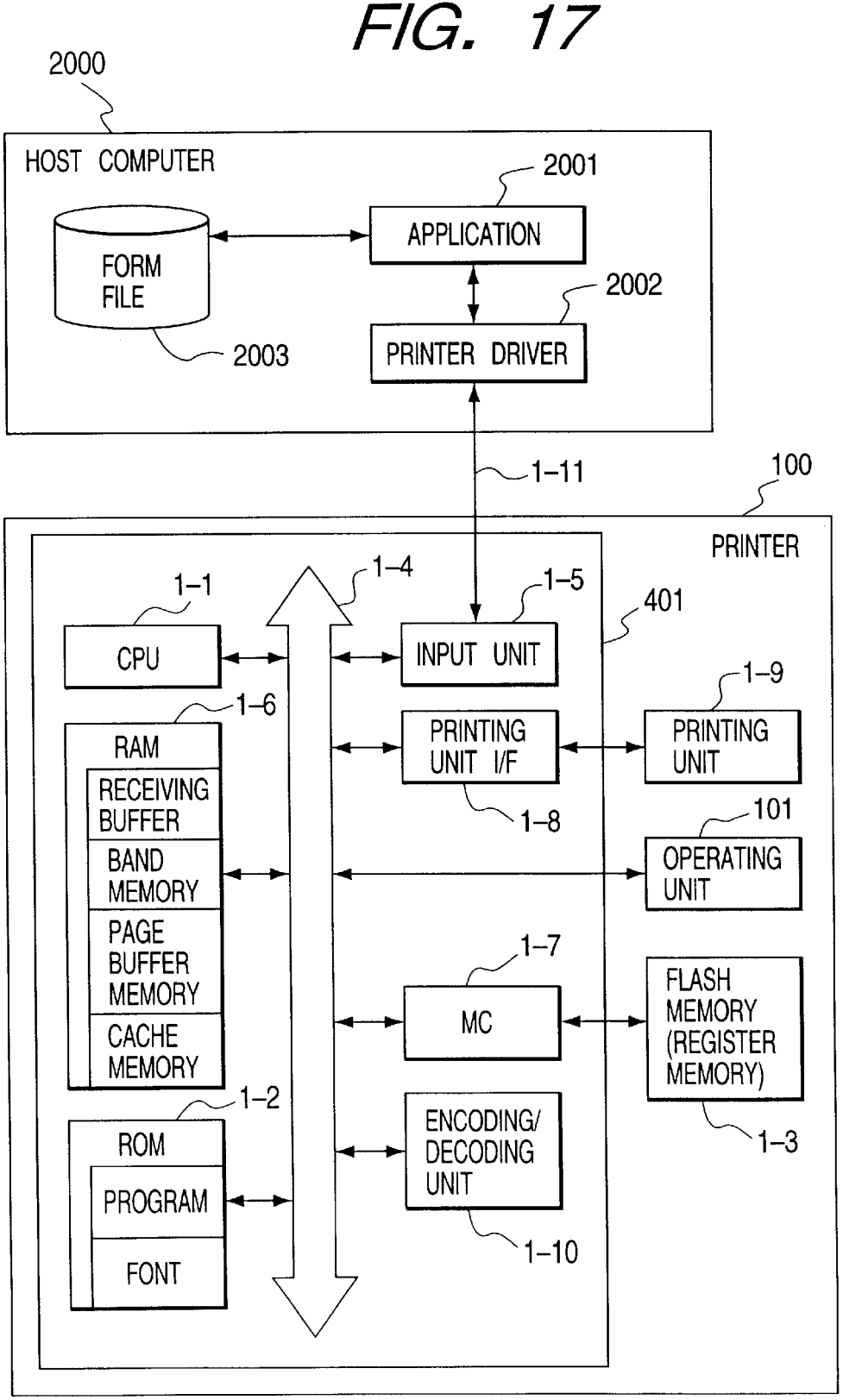
FIG. 17 is a block diagram showing another example of a printer.

FIG. 17 is a block diagram of the printer control unit 401 of the above embodiments. The invention is obviously applicable to a single apparatus, a system made of a plurality of apparatuses, and a system performing various processing via a network such as LAN, so long as the functions of the above embodiments are realized.

In FIG. 17, reference numeral 2000 represents a host computer which is connected to the printer control unit 401 via a predetermined interface 1-11 (e.g., bi-directional interface) and performs a communication control process for the printer 100.

In the printer control unit 401, a printer CPU 1-1 collectively controls an access to each device connected to a system bus 1-4, in accordance with a control program in a ROM 1-2, and outputs an image signal as output information to a printing unit (printer engine) 1-9 via a printing unit interface 1-8. Control programs in ROM 1-2 include a control program for CPU 1-1, an image forming program for forming a bit map image to be transferred to the printing unit 1-9, and other programs, as illustrated in FIGS. 3 to 9. ROM 1-2 also stores font data (outline font data or dot font data) or the like to be used when the output image is generated.

CPU 1-1 can communicate with the host computer via an input unit 1-5. A RAM 1-6 is used as a main memory, work area and the like of CPU 1-1, and the memory capacity can be increased by connecting an optional RAM to an unrepresented expansion board. RAM 1-6 has a receiving buffer for storing received data, a page buffer memory for storing print data in the form of intermediate code, a band memory for developing into a bit map image, and a cache memory for storing a form bit map image. A flash memory 1-3 as the external memory is used as a registration memory for storing form data transferred from a form file of the host computer 2000.

One function of an encoding/decoding unit 1-10 is to encode a bit map image of form data developed in a band memory of RAM 1-6. Form image information encoded under the image generating program control is stored in the cache memory of RAM 1-6.

An access to the flash memory 1-3 is controlled by a memory controller (MC) 1-7. The flash memory 1-3 is connected as an option and stores form data, font data, emulation program or the like. The operating unit 101 has switches and LCD displays for the operation of the printer.

The flash memory may be not only one memory but also it may be configured by a plurality of memories, including an optional font card in addition to built-in fonts and an external memory for storing programs which analyze different printer control languages (PDL). A memory card such as a hard disk different from the flash memory may be loaded. An NVRAM may be provided in order to store printer mode setting information supplied from the operating unit 101.

An application program 2001 running on the host computer 2000 generates form data of PDL to be registered in the printer control system, by using a printer driver program 2002, and stores it in a hard disk 2003 or the like of the host side. In this case, data output from the printer driver is not supplied to the interface 1-11 but is redirected to the hard disk 2003 of the host computer.

The form file in the hard disk 2003 is transferred to the printer control unit 401 prior to transferring back matter print data, and stored in the flash memory 1-3. The storage device of form data is not limited only to the flash memory, but may be another memory card o r RAM 1-6.

In the printer system constructed as above , form data of PDL format received from the host computer 2000 is stored in the flash memory 1-3. Upon a form rasterizing command, the form data is read. Of the form data, the print data such as character codes and graphic data is stored in the page buffer of RAM 1-6 at respective bands corresponding to the designated print positions. After the form data of one page is stored in the intermediate page buffer, a bit map image is generated one byte after another in the band memory, and encoded by the encoding/decoding unit 1-10. Thereafter the encoded form image of one page and form generation information of the conditions of forming a form image are stored in the cache memory of RAM 1-6.

The back matter print data from the host computer 2000 is temporarily stored in the receiving buffer. The print data such as character codes and graphic data is stored in the page buffer of RAM 1-6 at respective bands corresponding to the designated print positions. After the print data of one page is stored in the intermediate page buffer, a form image of each band is read and transferred to the band memory while the encoded data of each band is decoded by the encoding/decoding unit 1-10 into a bit map image. Thereafter, the back matter data is read from the intermediated page buffer and rasterized to synthesize an bit map output image. The bit map information is converted into a video signal in the printing unit interface 1-8 and output to the printing unit 1-9 to record it on a recording sheet or the like.

Fifth Embodiment

Figure 18:
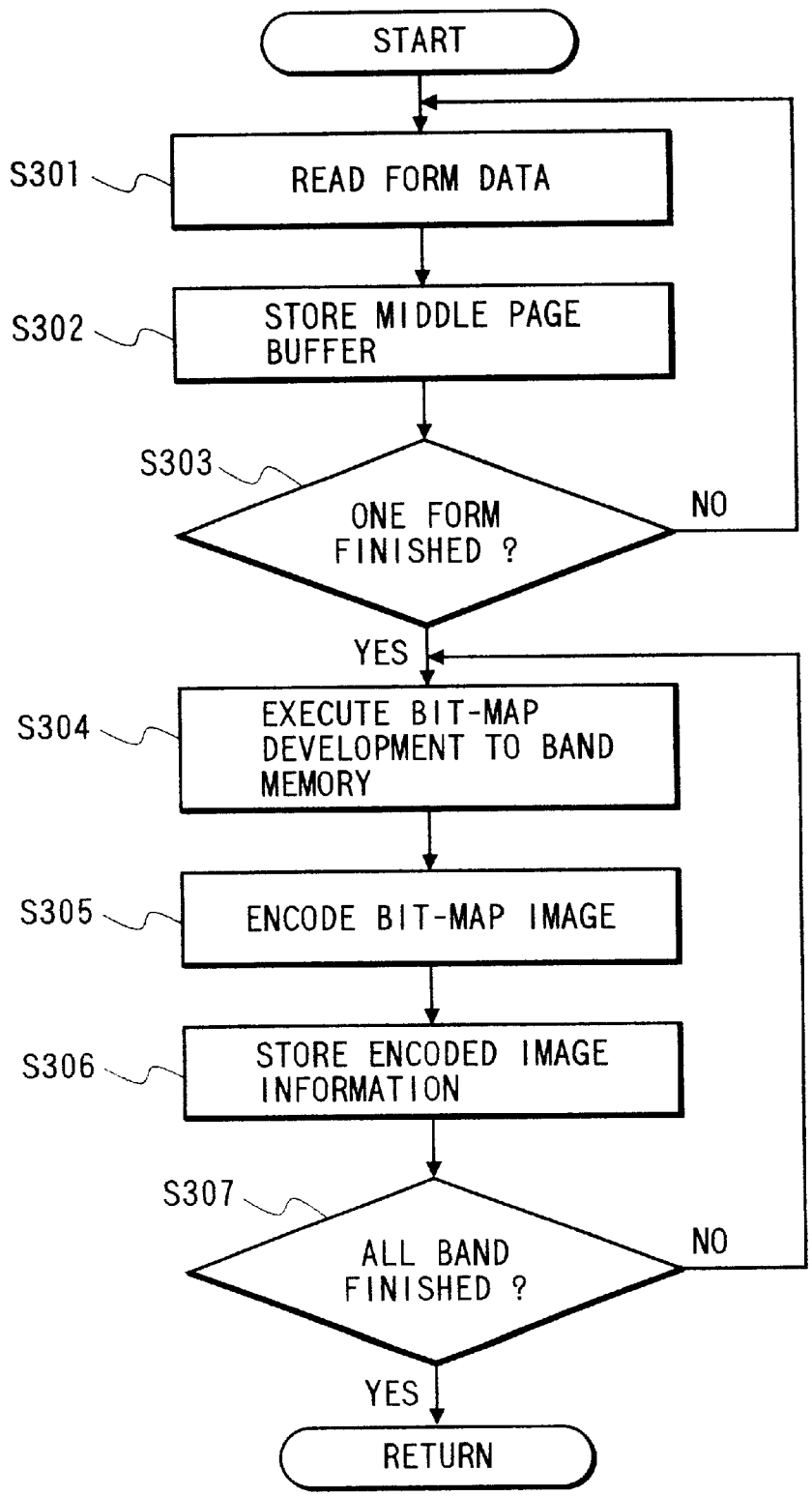
FIG. 18 is a flow chart illustrating a process of loading a form image into a cache according to an embodiment of the invention.
Figure 19:
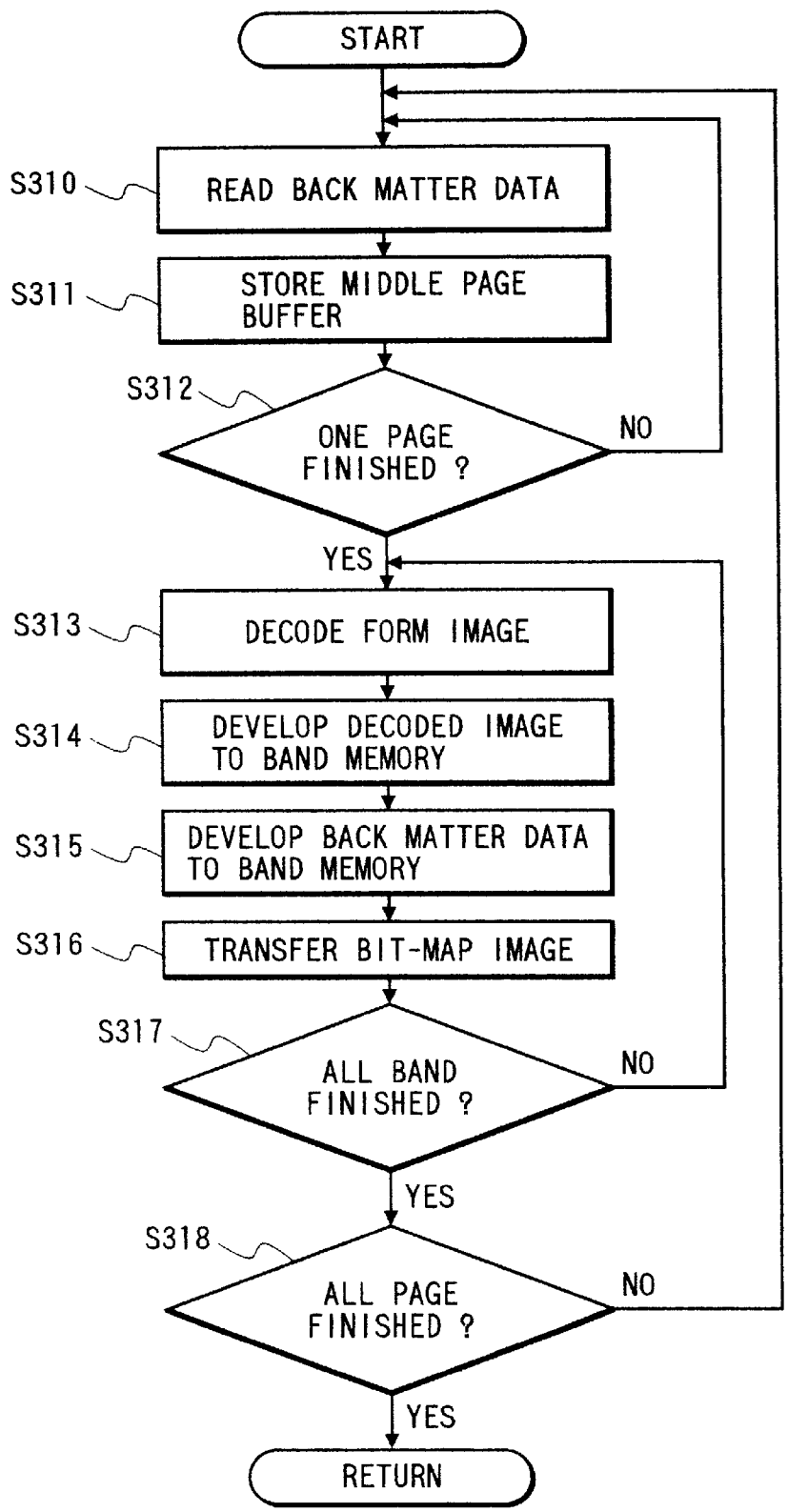
FIG. 19 is a flow chart illustrating a print process according to a fifth embodiment of the invention.
Figure 20:
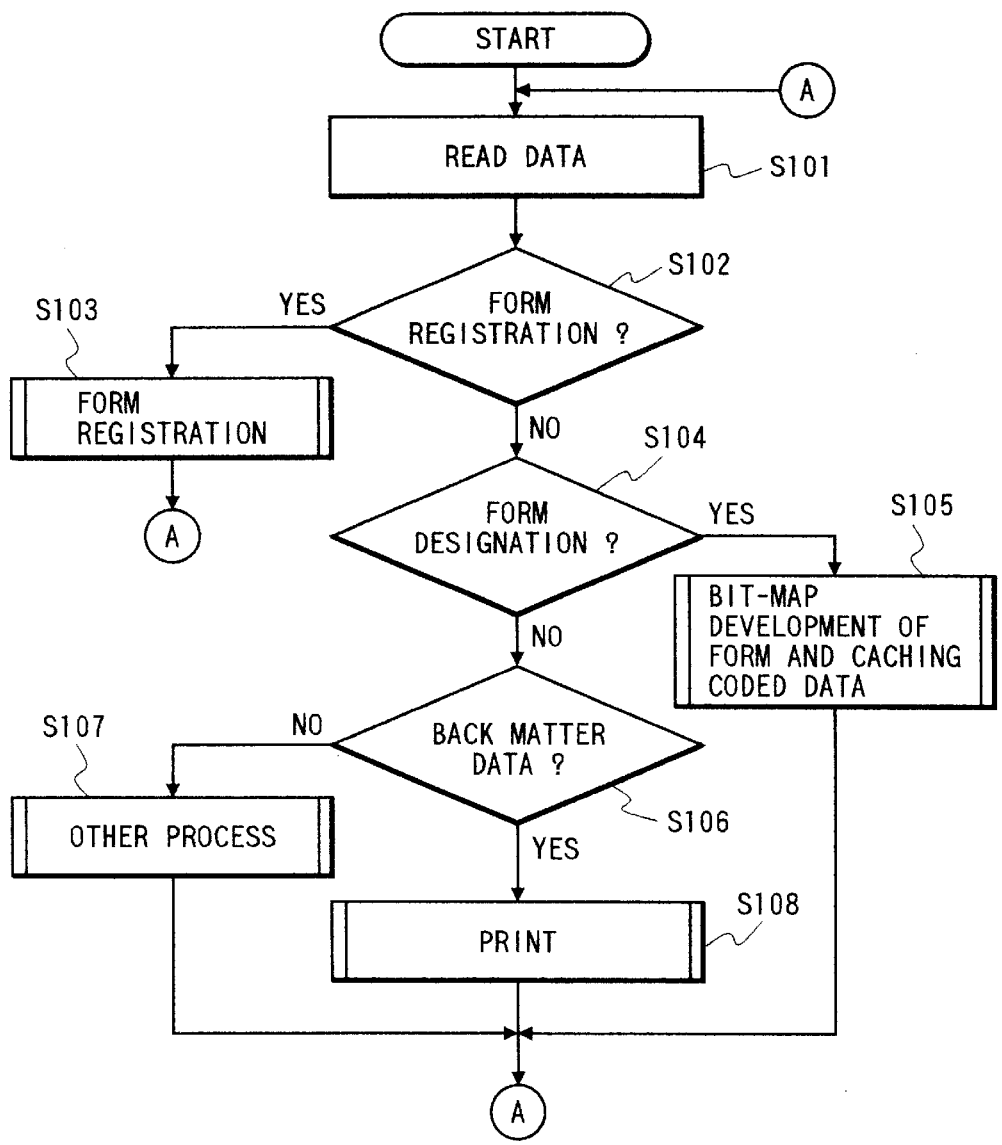
FIG. 20 is a flow chart illustrating an overall procedure of the fifth embodiment.

The processes of CPU 1-1 performing the above operation will be described with reference to the flow charts shown in FIGS. 18 to 20.

The overall operation of this embodiment will be described first with reference to the flow chart shown in FIG. 20. As data is transferred from the host computer to the input unit 1-5, the input unit 1-5 outputs an interrupt signal to CPU 1-1. It is assumed that upon reception of this interrupt signal, CPU 1-1 performs a process of sequentially storing the received data in the receiving buffer so long as the receiving buffer has a vacant or empty area (or already processed area).

First, at Step S101 if the receiving buffer has data, this data is read. At Steps S102, S104 and S106, it is checked whether the data is form registration data, form use designating data, or back matter data.

If it is judged that the data is form registration data, the flow advances from Step S102 to Step S103 whereat the form data is registered in the flash memory 1-3 as the form registration data.

If it is judged that the data is a command of designating form data use, i.e., a command of performing an form overlay, then the flow advances to Step S105 whereat a pre-process (to be later detailed) is performed in order to make the use of designated form data smooth.

If it is judged that the data is back matter data, the flow advances to Step S108 whereat a print process (to be later detailed) is performed by synthesizing with the already designated form.

If the read data is judged to be the data different from the above data, the flow advances to Step S107 whereat a corresponding process is performed which is not relevant to the invention and therefore the description thereof is omitted.

Next, the pre-process at Step S105 will be described with reference to the flow chart shown in FIG. 18.

First, at Step S301 the designated form data among the registered form data is read from the flash memory 1-3, and at Step S302 a corresponding PDL analysis process is executed to store the intermediate data in the page buffer of RAM 1-6 at the print positions designated by control codes. In this case, the intermediate data is generated in accordance with the designated rotation angle, resolution and the like of the form. Until it is judged that the form print data of a predetermined data size is read and the process of one form is completed, the processes at Steps S301 and S302 are repeated at Step S303.

After it is judged that all data of one form page is completely read and stored in the intermediate page buffer, the process advances from Step S303 to Step S304.

At Step S304, the intermediate data stored in the intermediate buffer is read to generate bit map data of each band in the band memory of RAM 1-6. As described previously, the intermediate data is generated in accordance with the resolution, print sheet size and the like designated by the host computer. Therefore, the generated bit map data does not contain so-called jaggy (notches).

The flow advances thereafter to Step S305 whereat the bit map data generated in the band memory is encoded by the encoding/decoding unit 1-10 to compress it. Next, at Step S308, the encoded image information is stored in the cache memory of RAM 1-6. This process is repeated until it is judged that all bands distributed and stored in the intermediate buffer are processed (Step S307).

If all images are stored, the form page intermediate buffer is released.

Next, the process to be executed when the back matter print data is received at Step S108 shown in FIG. 20 will be described with reference to the flow chart of FIG. 19.

First, at Step S310 the print data (control codes indicating print positions, character codes and the like) stored in the receiving buffer is read. At Step S311 a corresponding PDL analysis process is performed to store the intermediate data in the page buffer of RAM. 1-6 at the print positions designated by control codes. This process is repeated at Step S312 until a page end control code in the back matter print data such as a page change command are detected.

After the back matter data of one page is stored, the flow advances to Step S313 whereat the encoded image stored in the cache memory of RAM 1-6 in units of band is decoded by the encoding/decoding unit 1-10. The decoded form image is developed into a bit map image in the band memory of RAM 1-16 (Step S314). The back matter data corresponding to the same band position is developed into a bit map image in the band memory to generate a synthesized image of the form image and back matter image (Step S315). For example, the form image of the corresponding band obtained through decoding is developed in the band memory, and the image (such as character images) of the back matter data is developed in the band memory through an OR process.

After the image of the back matter data and form image of one page are synthesized, the synthesized bit map image is transferred via the printing unit interface 1-8 to the printing unit 1-9 (Step S316). This process is repeated at Step S317 until it is judged that one page print is completed.

One print job may obviously include a plurality of pages. The processes at Step S310 and following Steps are repeated until it is judged at Step S318 that all pages are completely printed.

As above, according to this embodiment, in a form overlay print process, complicated processes for developing the intermediate codes into a bit map image are performed in advance and the obtained bit map image is registered in the cache memory. Therefore, even if the back matter data of a plurality of pages to be synthesized in a predetermined form is received, it is not necessary to perform a bit map development of the form data (PDL data) in units of page. The print process can therefore be performed at a high speed.

In printing a bit map image in units of band, if the print process once starts, the operation of the printer engine cannot be stopped at the midst of the operation, and in some case where a certain band has a complicated form portion, this form portion cannot be printed at proper timings. In this embodiment, such a problem can be solved.

The form image after developed is not enlarged or reduced, but the form image is formed in accordance with the print resolution, recording sheet size and the like and encoded and stored in the cache memory. It is therefore possible to obtain a high print quality.

In the above description, one form image is developed in a band memory and synthesized with the back matter image in one print job. The invention is not limited thereto. For example, a plurality of form images may be synthesized in the band memory.

Furthermore, the means for synthesizing with a form image may be configured so that it can designate a drawing logic such as deletion and inversion of a partial area of the form developed in the band memory. The incorporation of the edit operation of a form image allows forms to be used in common so that the use efficiency of the form registration memory and cache memory can be further improved.

In the above description, the back matter image is synthesized after one form image is developed in the band memory. The invention is not limited thereto. For example, after the back matter data is developed into a bit map image in the band memory, the form image may be synthesized.

Although the embodiment of the banding control system has been described, the full paint control system may be used. In this case, although an image forming process, an encoding process and a decoding process in units of band are performed in the above embodiment, these processes may be performed in the units of page.

Sixth Embodiment

In the fifth embodiment, a plurality of pages are printed by using one form a plurality of times. In the sixth embodiment, one job uses a plurality of forms a plurality of times to print a plurality of pages. For example, by using forms A and B, pages are printed with the forms A, B, A, B, . . . It is assumed here that the cache memory of RAM 1-6 of this embodiment has a capacity capable of storing a plurality set of encoded form data.

Figure 25:
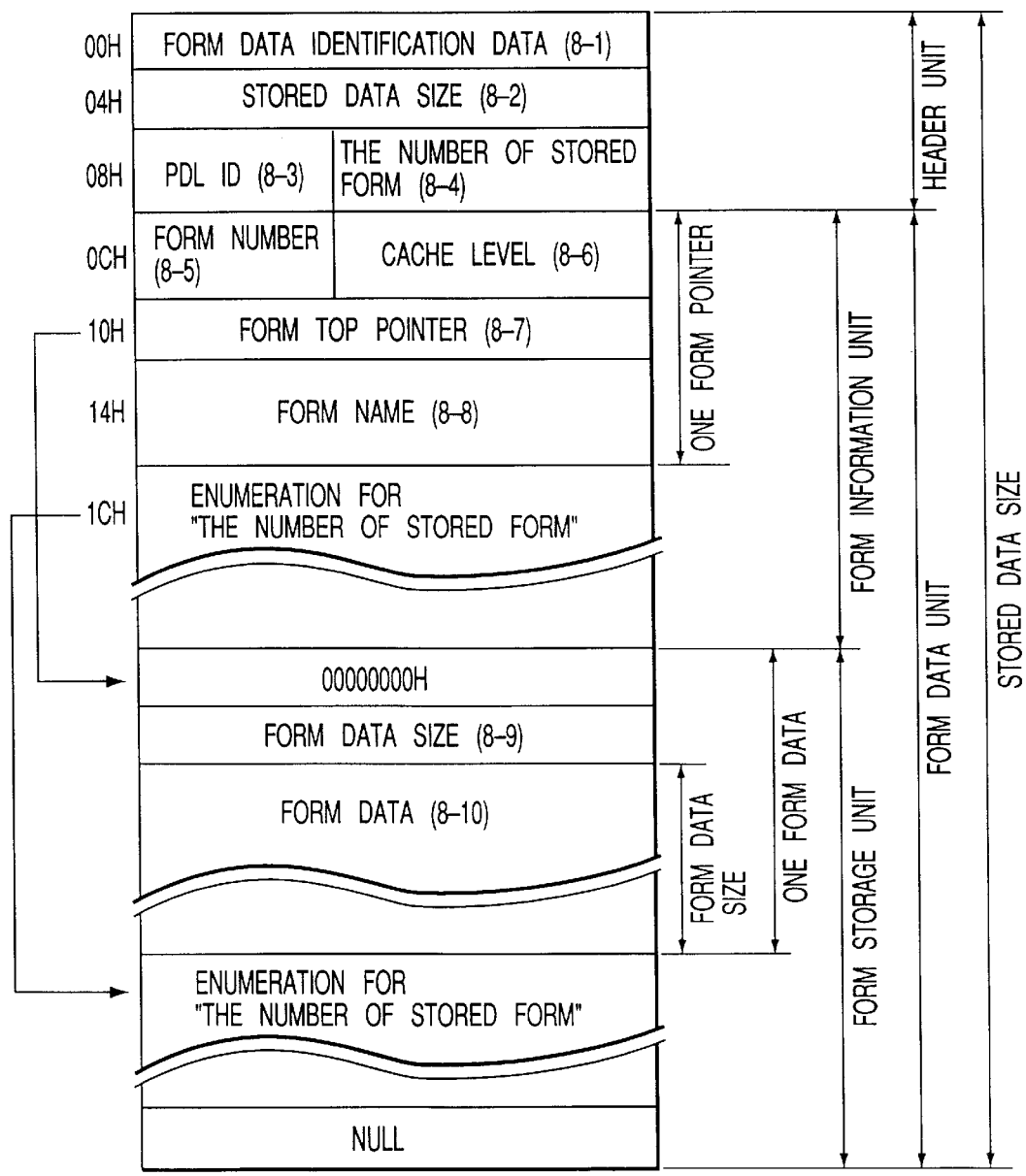
FIG. 25 shows the format of form data.

FIG. 25 shows the format of PDL type form data (data stored in the flash memory) of the sixth embodiment (also similar to the first embodiment).

As shown, the format of the form data is constituted of a header unit (form data identification, stored data size, PDL ID, number of stored forms) and a form data unit. The form data unit includes a form number, a cache level, a storage location pointer (address) of form data, and also a form pointer constituted of a form name. These fields are provided as many as the number of forms.

Figure 26:
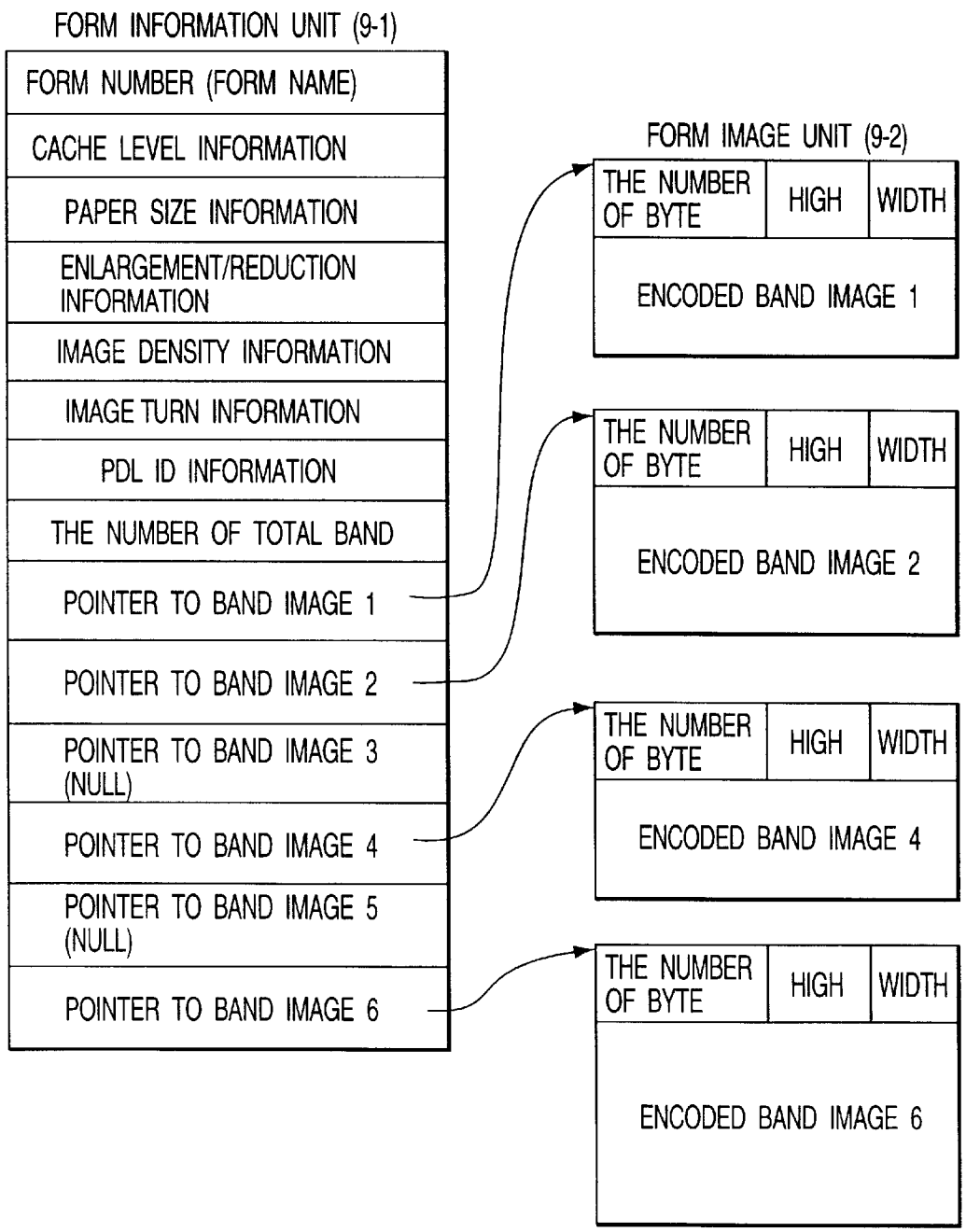
FIG. 26 shows the format of form data loaded in a cache memory.

FIG. 26 shows the contents of a management table of one set of form data (encoded data in units of band after bit map development) stored in the cache memory of the sixth embodiment.

As shown, the management table includes for each form a number (name) identifying the form, a cache level, sheet size information (sheet size information designated for an overlay print), enlargement/reduction information (dependent upon a form size), pixel density information (resolution), image rotation information, PDL ID information, the total number of bands (information indicating the number of bands which cover the form), and an address pointer to the storage location of encoded data of each band which is dependent upon the total number of bands. If there are a plurality of forms, the above information set is prepared as many as the number of forms.

Figure 24:
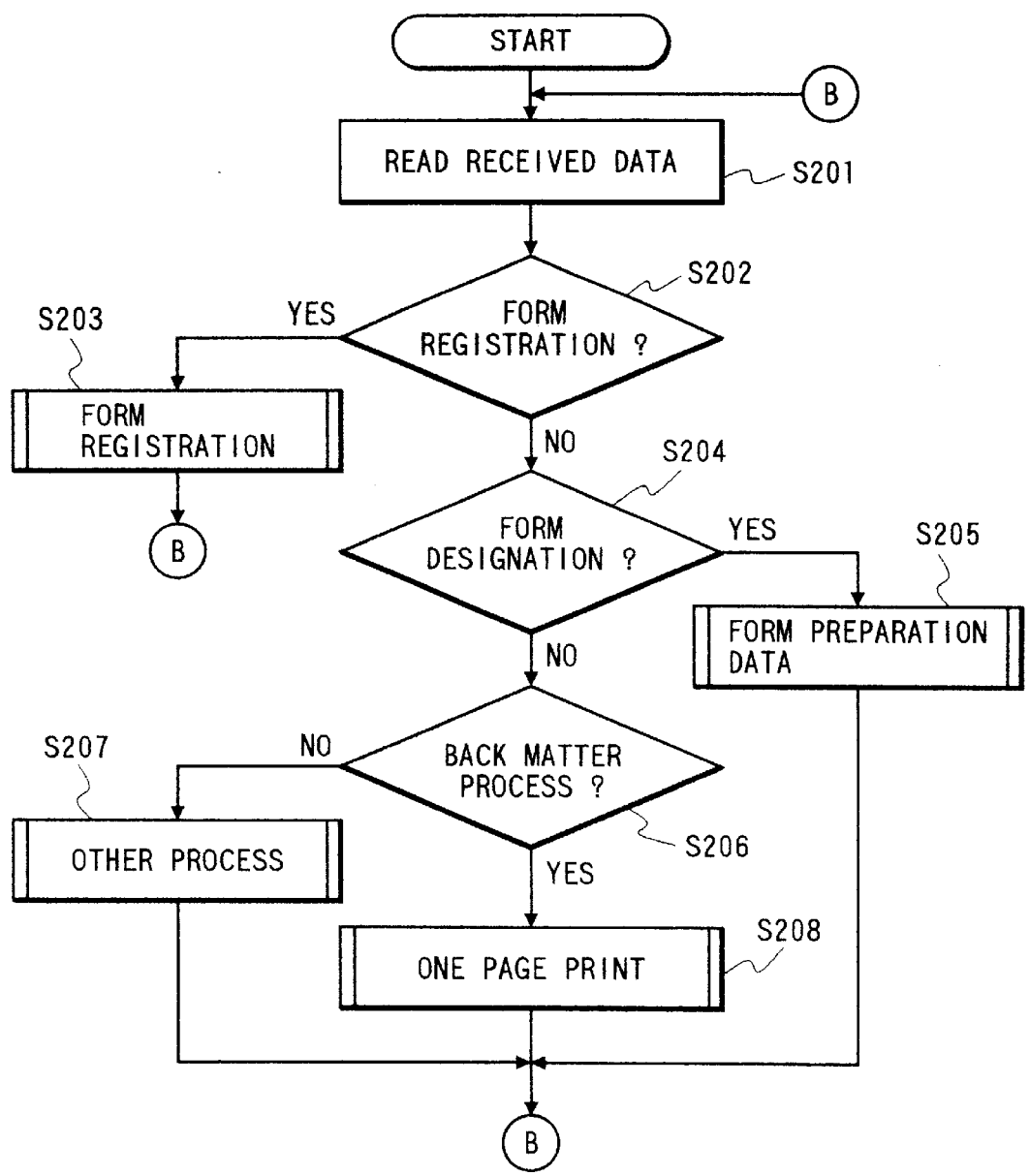
FIG. 24 is a flow chart illustrating an overall procedure of the sixth embodiment.

FIG. 24 illustrates the total operation procedure of the sixth embodiment. Different points from the fifth embodiment shown in FIG. 20 reside in that Step S208 performs one page print whereas at Step S108 one job performs a print of a plurality of pages, and in that a process of Step S205 is used instead of Step S105. The other points are the same as the fifth embodiment. Therefore, in the following the processes at Steps S205 and S208 will be described.

Figure 21:
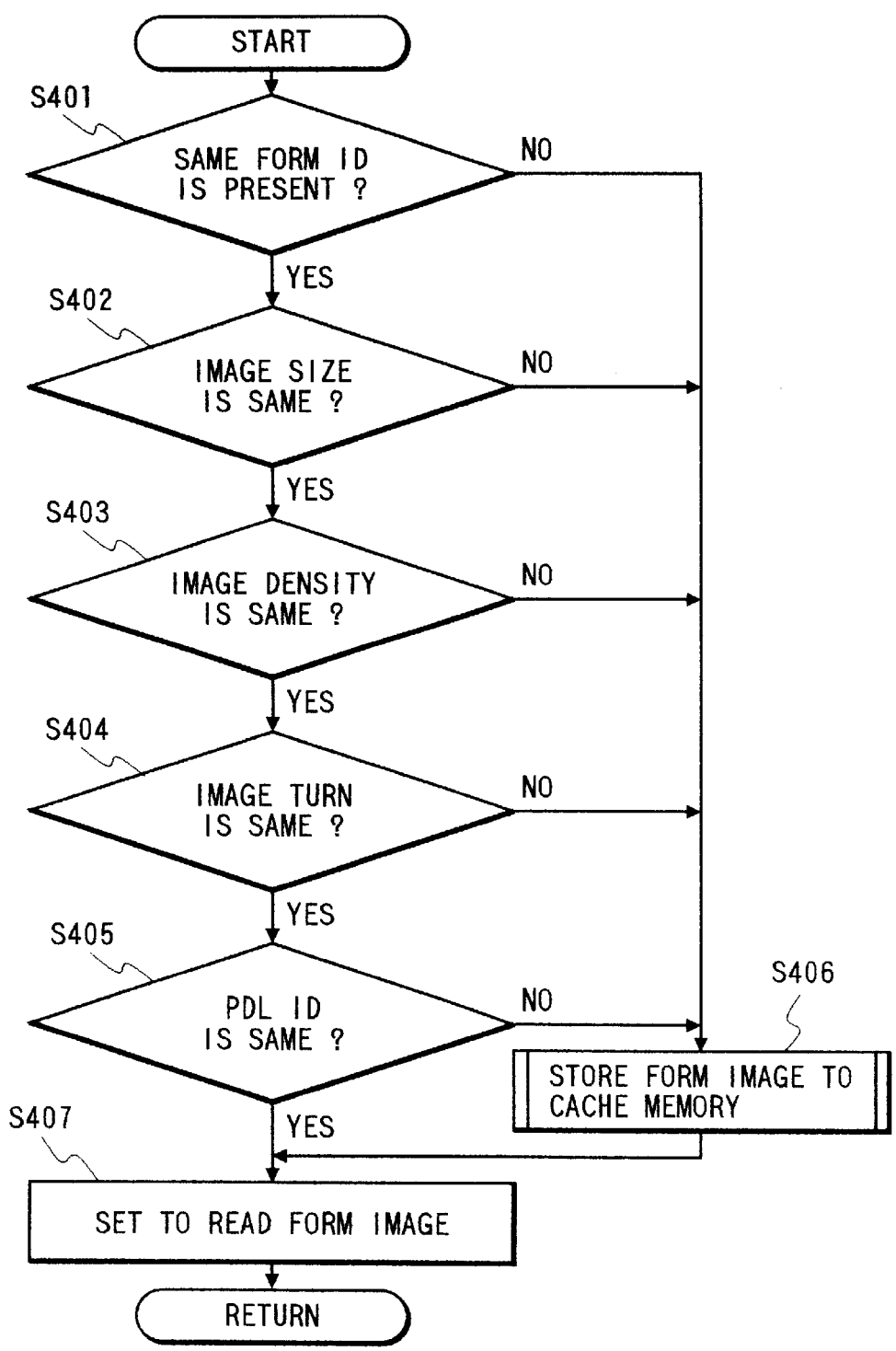
FIG. 21 is a flow chart illustrating a form forming process according to a sixth embodiment of the invention.

FIG. 21 is a flow chart illustrating the process contents of Step S205.

First, at Step S401 it is checked whether the cache memory stores the encoded data having the same form as the designated form ID (or name). If not, the flow advances to Step S406 whereat bit map data corresponding to the designated form ID (name) is generated and encoded to be stored in the cache memory. This process of registration in the cache memory is similar to the process shown in FIG. 18 of the fifth embodiment and so the detailed description thereof is omitted.

If it is judged that the encoded data of the same form ID (name) is stored in the cache memory, the flow advances to Step S402.

The processes of Step S402 and following Steps up to Step S405 judge whether the encoded data stored in the cache memory can be actually used.

Specifically, at Step S402 it is judged, although the encode data of the same form ID (name) is stored, whether the form image size such as the enlargement/reducing ratio and sheet size is the same as the form to be printed in an overlay manner. At Step S403 it is judged whether the bit map image density such as a resolution is the same. At Step S404 it is judged whether the image rotation angle is the same. At Step S405 it is judged whether PDL ID indicating the PDL type of the original data (registered data) of the generated image is the same.

If all the conditions of Steps S401 to S405 are satisfied, the form data stored in the cache memory can be used so that necessary setting is established in order to use the encoded data stored in the cache memory as the form to be used.

If the above judgments are all "NO", the encoded data necessary for the form is not stored in the cache memory as described earlier. In this case, therefore, the flow advances to Step S406 whereat the corresponding data is read from the flash memory 1-3, developed into bit map data in units of band, encoded, and stored in the cache memory. After the process at Step S406 is completed, necessary setting is performed in order to use the data stored in the cache memory at Step S407.

Figure 22:
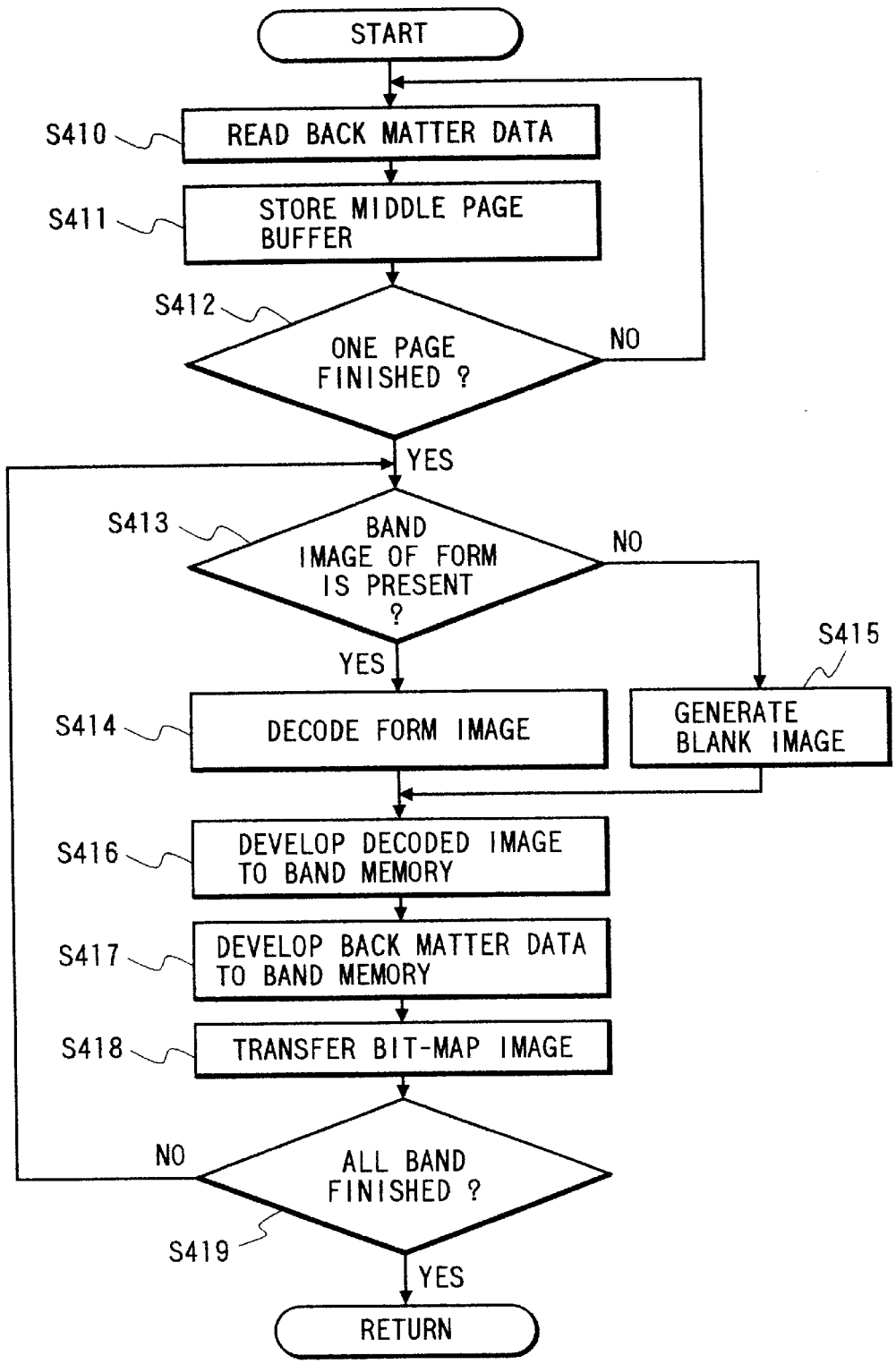
FIG. 22 is a flow chart illustrating a print process of one page according to the sixth embodiment.

The process (one page print) at Step S208 shown in FIG. 24 will be described with reference to the flow chart of FIG. 22.

First, at Step S410 the back matter print data (such as control codes indicating print positions and character codes) of one page are read. Next,-at Step S411 a PDL analysis process for the input data is executed to store the intermediate data in the page buffer of RAM 1-6 in units of band at print positions designated by the control codes. The processes at Steps S410 and S411 are repeated until it is judged that one page process is completed (Step S412).

After the intermediate data of one page is formed in units of band, the process advances from Step S412 to Step S413 whereat it is judged whether there is a form band image of the subject band. If the form uses the fifth to tenth bands and the subject band is different from these bands, the judgement at this Step S413 is NO so that a blank image is generated (Step S415) and at Step S416 the blank image is developed in the band memory. Conversely, if the subject band is one of the fifth to tenth bands, there is a form and the judgement at Step S413 is YES so that the encoded form image data of the subject band is decoded (Step S414) and the decoded image data is developed in the band memory (Step S416).

At the next Step S417 the intermediate data of the back member data of the subject band is developed into a bit map image in the band memory for the image synthesis. After this image synthesis development, the bit map image data of the subject band developed in the band memory is transferred to the printing unit 1-9 via the printing unit interface 1-8.

The processes at Step S413 and following Steps are repeated until the bit map images of one page is transferred to the printing unit (Step S419).

After one page print is completed, the back member intermediate page buffer is released. In the above description, although the cache memory in RAM 1-6 is used for storing form encoded images, the form encoded image may be stored in another memory, for example, in the flash memory 1-3 under control of MC 1-7.

It can be understood that the above description can be replaced by the following description when the flow chart of FIG. 24 is again referred to.

As the host computer 2000 instructs to register form data, the form data is registered in the flash memory 1-3 (Step S203). If information which identifies the form to be used by one job is supplied, the designated form data is read from the flash memory 1-3, developed into a bit map in accordance with the designated size and resolution, encoded and compressed in units of band, and stored in the cache memory. If the back member data is received, the form designated by the back member data is read from the cache memory, and after decoding, the back member bit map data is synthesized and printed out.

In the above embodiment, although the form image is searched in accordance with the image size, image density, image rotation, and PDL ID, this search process changes with the image forming performance of the system. For example, if the system can deal with a multi-value image capable of tonal representation of each pixel image, the half-tone information may be used as the search key. If the system uses a color printer, a pixel image is provided for each color component so that the color component information may be used as the search key.

In the fifth and sixth embodiments, although the banding control system has been incorporated, the full paint control system may be used. In this case, although an image forming process, an encoding process and a decoding process in units of band are performed in the above embodiment, these processes may be performed in the units of page.

Figure 23:
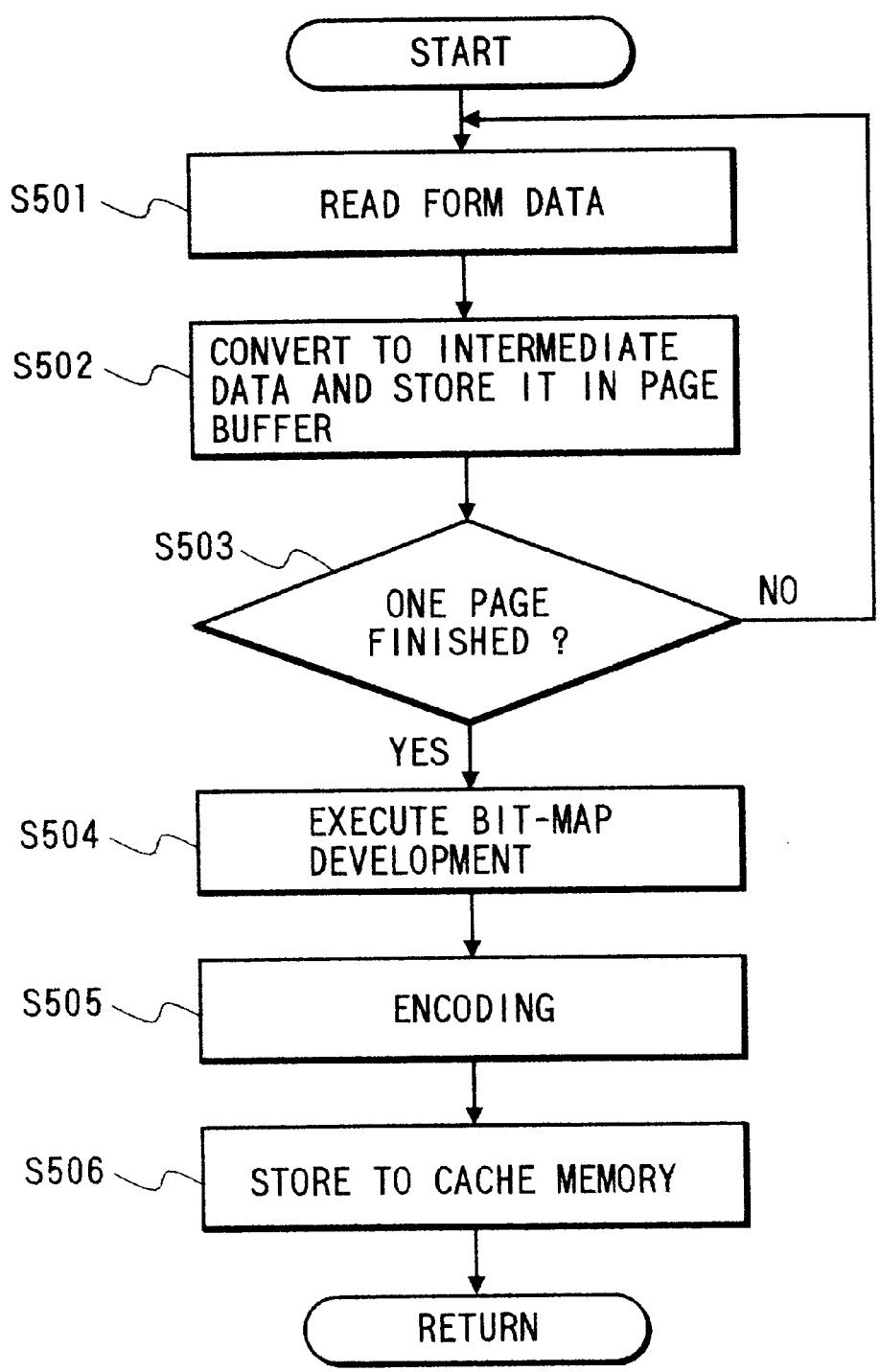
FIG. 23 is a flow chart illustrating another example of a process of loading form data into a cache according to the sixth embodiment.

FIG. 23 is a flow chart illustrating the process to be replaced by Step S406 when the form image of a page unit is stored in the cache memory.

First, at Step S501 the corresponding form data (PDL type data) is read, and at Step S502 converted into the intermediate data in accordance with the designated type (such as rotation information) and size to store it in the page buffer. The processes at Steps S501 and S502 are repeated until one page is processed.

After the intermediate data of one page is generated, the process advances to Step S504 whereat the intermediate data of one page is developed into a bit map image. Thereafter, an encoding process is performed to generate encoded data (Step S505) and store it in the cache memory (Step S506).

In the above processes, after the intermediate data of one page is generated, it is developed into a form bit map image of one page. In the full paint control system, the bit map image may be generated while the intermediate code is generated, or in some case, the bit map image may be developed without generating the intermediate code. In this case, although a process time is made somewhat slow, the occupied memory capacity can be reduced.

In a color printer, the form information unit (9-1) is provided with color component information and a band pointer of each color component, and the processes of generating a bit map image of each color component and storing it are repeated.

Seventh Embodiment

Figure 27:
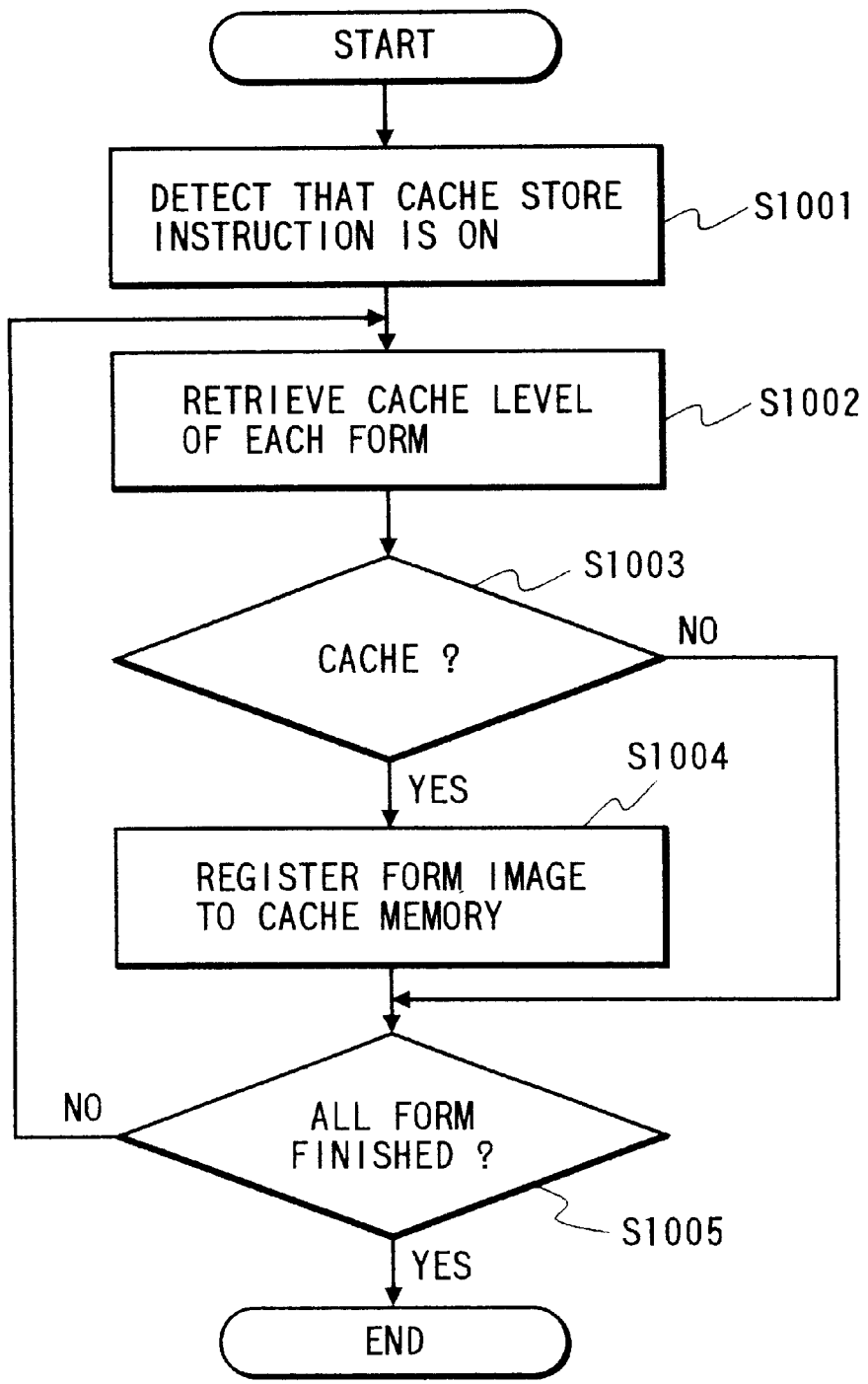
FIG. 27 is a flow chart illustrating a form registration procedure according to a seventh embodiment of the invention.

FIG. 27 is a flow chart illustrating the form image generating procedure to be executed by the printer according to the seventh embodiment.

It is assumed that forms are already registered in the flash memory 1-3 of the printer 100 as described with FIG. 25. A switch for selecting either to execute this procedure or not is provided in NVRAM capable of being changed by the operating unit 101.

As the power switch of the printer 100 is turned on, CPU 1-1 performs various initializing processes in accordance with a program stored in the program ROM 1-2. If a cache registration instruction settable by the operating unit 101 is detected during the initializing process (Step S1001), the form data identifier (8-1) in the flash memory 1-3 is searched, and the cache level (8-6) stored for each of registered forms is read (Step S1002). It is judged whether the form corresponding to the read cache level (8-6) is stored in the cache memory of RAM 1-6 (Step S1003). If it is judged that the form is to be cached, the form is rasterized to store the encoded form image as described earlier with FIG. 23 (Step S1004). Thereafter, since there is no back data information, a form image generating process is performed under the default conditions of the printer 100.

If it is judged at Step S1003 that the form is not necessary to be cached, the cache level of the next form is read and the above operations are repeated until all registered forms are searched.

In the above manner, prior to inputting the back member print data, the bit map form image is generated and when the back member print data is input, the form is selected by the cache memory search process described with Steps S403 to S407 of the sixth embodiment. It is therefore possible to shorten the form generation time even for the form data to be first used.

If the above procedure is performed automatically when the power is turned on, a frequently used form can be registered in advance in the cache memory. It is therefore possible to perform a high speed form overlay print in daily transactions.

In the above description, although the procedure is performed when the power is turned on, the invention is not limited thereto. For example, this procedure may be performed in a print standby state while there is no back member print data process.

Although the default conditions are used for the form image generation conditions (resolution, enlargement/ reducing ratio and the like), the invention is not limited thereto. The form image generation conditions may be changed or a form image generated under a plurality of form image generation conditions may be registered in the cache memory.

The processes of the fifth to seventh embodiments are mainly performed by CPU 1-1 in accordance with a program. This program may be realized in the form of an external memory card. Specifically, it is obvious that the above processes can be performed also in the case where a system or apparatus is supplied with a storage medium storing program codes of software realizing the functions of the above embodiments and the computer (CPU, MPU) of the system or apparatus reads and executes the program codes stored in the storage medium.

In this case, the program codes themselves read from the storage medium realize the novel functions of the invention. Therefore, the storage medium storing the program codes constitutes the present invention.

The storage medium storing such program codes may be a floppy disk, a hard disk, an optical disk, a magnetooptical disk, a CD-ROM, a magnetic tape, a non-volatile memory card, and a ROM.

Obviously, the invention covers other modifications not only for the case wherein the embodiment functions are realized by executing the program codes read by the computer but also for the case wherein the embodiment functions are realized by performing part or the whole of the actual processes in accordance with the program codes by an OS (operating system) or the like on which the computer runs.

Furthermore, the scope of the invention also includes obviously the case wherein in accordance with the program codes stored in a memory of a function expansion board or unit connected to the computer supplied with the program codes read from the storage medium, a CPU or the like of the function board or unit executes part or the whole of the actual tasks for realizing the embodiment functions.

Although a laser beam printer has been described in connection with the above embodiments, the invention is not limited thereto but is applicable to all types of printers. However, it is preferable as discussed in the embodiments that the printer can operate at high speed in some degree. From this viewpoint, a page printer typically a laser printer and an LED printer is preferable.

In the above embodiments, the printer control unit 401 and the printing unit are integrally formed. These units may be formed discretely.

In the embodiments described above, a form image generated prior to the back member print data is stored in the cache memory so that a process time of a form overlay print can be shortened.

In the embodiments described above, since the form image is generated in units of band and then encoded and stored in the cache memory, the cache memory can be adaptatively used and an increase of the cache memory capacity can be suppressed.

The band not having an output image of form data to be printed is not assigned with the cache memory. Therefore, the use efficiency of the cache memory can be improved.

Further, a form image generated adaptatively under the conditions (resolution, enlargement/reduction, page rotation and the like) of generating the back member print data can be stored in the cache memory. Therefore, the process time of a form overlay process can be shortened.

Still further, by storing a form image generated adaptatively under the conditions (resolution, enlargement/reduction, page rotation and the like) of generating the back member print data in the cache memory, the registration memory capacity can be reduced.

As described above, according to the present invention, a form overlay process can be performed at high speed.

What is claimed is:

1. A print control apparatus for receiving print data from an external apparatus and processing the print data, comprising:

storage means for storing first print data of a first data format, a plurality of second print data of a second data format converted from the first print data and a plurality of attribute information corresponding to the respective second print data, the plurality of attribution information being different from each other;

first storage control means for controlling said storage means to store the first print data;

second storage control means for controlling said storage means to store the second print data with the first print data being maintained in said storage means;

determination means for determining whether the second print data, appropriate to print attribute information of third print data received from the external apparatus, is stored in said storage means on a basis of the plurality of attribute information stored in said storage means;

image generating means for, when said determination means determines that the appropriate second print data is stored in said storage means, overlaying image data based on the appropriate second print data and image data based on the third print data on each other so as to generate overlaid image data; and conversion means for, when said determination means determines that the appropriate second print data is not stored in said storage means, converting the first print data stored in the storage means into the second print data based on the print attribution of the third print data, wherein the second print data converted by said conversion means is stored in said storage means with the print attribution of the third print data.

2. An apparatus according to claim 1, wherein said second storage control means controls the storage means to delete the second print data stored therein according to a storage capacity of the storage means.

3. An apparatus according to claim 1, wherein said conversion means converts the stored first print data into the second print data according to a print condition of the third print data received from the external apparatus, and said second storage control means controls the storage means to store the converted second print data according to the print condition of the third print data.

4. An apparatus according to claim 3, wherein said conversion means enlarges or reduces the first print data and then converts the enlarged or reduced first print data into the second print data.

5. An apparatus according to claim 3, wherein said conversion means rotates the first print data and then converts the rotated first print data into the second print data.

6. An apparatus according to claim 1, wherein the second print data comprises bit map image data.

7. An apparatus according to claim 1, wherein the second print data comprises compressed bit map image data.

8. An apparatus according to claim 1, wherein the second print data comprises intermediate data formed with predetermined drawing elements.

9. An apparatus according to claim 1, wherein the second print data comprises form data used for generating a predetermined page form.

10. An apparatus according to claim 1, further comprising reception means for receiving the first and second print data from the external apparatus, wherein said first and second storage control means control the storage means to store the first and second print data, respectively, received by said reception means.

11. An apparatus according to claim 1, further comprising obtaining means for obtaining information on the storage means, wherein said conversion means selects the second data format from among a plurality of data formats according to the information obtained by said obtaining means.

12. An apparatus according to claim 1, wherein said second storage control means controls the storage means to store the second print data in a band unit, one page of the second print data being divided into bands, and wherein said image generating means generates the overlaid image data by the band unit.

13. An apparatus according to claim 12, wherein said image generating means overlays image data based on the second print data and image data based on third print data on each other by the band unit so as to generate the overlaid image data.

14. An apparatus according to claim 12, wherein said second storage control means controls the storage means to store the second print data as compressed by the band unit.

15. A print control method of receiving print data from an external apparatus and processing the print data, comprising:
a storage step, of storing in a storage means first print data of a first data format, a plurality of second print data of a second data format converted from the first print data and a plurality of attribute information corresponding to the respective second print data, the plurality of attribution information being different from each other;
a first storage control step, of controlling said storage step to store the first print data;
a second storage control step, of controlling said storage step to store the second print data, with the first print data being maintained in said storage means;
a determination step, of determining whether the second print data, appropriate to print attribute information of third print data received from the external apparatus, is stored in said storage means on a basis of the plurality of attribute information stored in said storage means;
an image generation step, of generating an image when said determination step determines that the appropriate second print data is stored in said storage means, overlaying image data based on the appropriate second print data and image data based on the third print data on each other so as to generate overlaid image data; and
a conversion step, of, when said determination step determines that the appropriate second print data is not stored in said storage step, converting the first print data stored in the storage step into the second print data based on the print attribution of the third print data,
wherein the second print data converted by said conversion step is stored in said storage step with the print attribution of the third print data.

16. A method according to claim 15, wherein said second storage means controlling step includes controlling the storage means to delete the second print data stored therein according to a storage capacity of the storage means.

17. A method according to claim 16, wherein said second storage means controlling step includes controlling the storage means to again store the second print data of the second data format according to a storage capacity of the storage means.

18. A method according to claim 15, further comprising the step of converting the first print data stored in the storage means into the second print data.

19. A method according to claim 18, wherein said converting step includes converting the stored first print data into the second print data according to a print condition of the third print data received from the external apparatus, and said second storage means controlling step includes controlling the storage means to store the converted second print data according to the print condition of the third print data.

20. A method according to claim 19, wherein said converting step includes enlarging or reducing the first print data and then converting the enlarged or reduced first print data into the second print data.

21. A method according to claim 19, wherein said converting step includes rotating the first print data and then converting the rotated first print data into the second print data.

22. A method according to claim 15, wherein the second print data comprises bit map image data.

23. A method according to claim 15, wherein the second print data comprises compressed bit map image data.

24. A method according to claim 15, wherein the second print data comprises intermediate data formed with predetermined drawing elements.

25. A method according to claim 15, wherein the second print data comprises form data used for generating a predetermined page form.

26. A method according to claim 15, further comprising the step of receiving the first and second print data from the external apparatus, wherein said first and second storage means controlling steps include controlling the storage means to store the first and second print data, respectively, received in said reception step.

27. A method according to claim 18, further comprising the step of obtaining information on the storage means, wherein said converting step includes selecting the second data format from among a plurality of data formats according to the information obtained in said obtaining step.

28. A methods according to claim 15, wherein said second storage means controlling step includes controlling the storage means to store the second print data in a band unit, one page of the second print data being divided into bands, and wherein said overlaying step includes generating the overlaid image data by the band unit.

29. A method according to claim 28, wherein said overlaying step includes overlaying image data based on the second print data and image data based on third print data on each other by the band unit so as to generate the overlaid image data.

30. A method according to claim 28, wherein said second storage means controlling step includes controlling the storage means to store the second print data as compressed by the band unit.

31. A memory medium according to claim 30, wherein said second storage means controlling step includes controlling the storage means to again store the second print data of the second data format according to a storage capacity of the storage means.

32. A memory medium according to claim 30, wherein said converting step includes converting the stored first print data into the second print data according to a print condition of the third print data received from the external apparatus, and said second storage means controlling step includes controlling the storage means to store the converted second print data according to the print condition of the third print data.

33. A storage medium storing a computer readable program for receiving print data from an external apparatus and processing the print data, wherein the program comprises:
code for a storage step, of storing in a storage means first print data of a first data format, a plurality of second print data of a second data format converted from the first print data and a plurality of attribute information corresponding to the respective second print data, the plurality of attribution information being different from each other;
code for a first storage control step, of controlling said storage step to store the first print data;
code for a second storage control step, of controlling said storage step to store the second print data, with the first print data being maintained in said storage means;
code for a determination step, of determining whether the second print data, appropriate to print attribute information of third print data received from the external apparatus, is stored in said storage means on a basis of the plurality of attribute information stored in said storage means;

code for an image generation step, of generating an image when said determination step determines that the appropriate second print data is stored in said storage means, overlaying image data based on the appropriate second print data and image data based on the third print data on each other so as to generate overlaid image data; and code for a conversion step, of when said determination step determines that the appropriate second print data is not stored in said storage step, converting the first print data stored in the storage step into the second print data based on the print attribution of the third print data, wherein the second print data converted by said conversion step is stored in said storage step with the print attribution of the third print data.

34. A memory medium according to claim 33, wherein said second storage means controlling step includes controlling the storage means to delete the second print data stored therein according to a storage capacity of the storage means.

35. A memory medium according to claim 33, wherein the program further comprises the step of converting the first print data stored in the storage means into the second print data.

36. A memory medium according to claim 35, wherein said converting step includes enlarging or reducing the first print data and then converting the enlarged or reduced first print data into the second print data.

37. A memory medium according to claim 35, wherein said converting step includes rotating the first print data and then converting the rotated first print data into the second print data.

38. A memory medium according to claim 33, wherein the second print data comprises bit map image data.

39. A memory medium according to claim 33, wherein the second print data comprises compressed bit map image data.

40. A memory medium according to claim 33, wherein the second print data comprises intermediate data formed with predetermined drawing elements.

41. A memory medium according to claim 33, wherein the second print data comprises form data used for generating a predetermined page form.

42. A memory medium according to claim 33, further comprising the step of receiving the first and second print data from the external apparatus, wherein said first and second storage means controlling steps include controlling the storage means to store the first and second print data, respectively, received in said reception step.

43. A memory medium according to claim 35, wherein said program further comprises the step of obtaining information on the storage means, wherein said converting step includes selecting the second data format from among a plurality of data formats according to the information obtained in said obtaining step.

44. A memory medium according to claim 33, wherein said second storage means controlling step includes controlling the storage means to store the second print data in a band unit, one page of the second print data being divided into bands, and wherein said overlaying step includes generating the overlaid image data by the band unit.

45. A memory medium according to claim 44, wherein said overlaying step includes overlaying image data based on the second print data and image data based on third print data on each other by the band unit so as to generate the overlaid image data.

46. A memory medium according to claim 44, wherein said second storage means controlling step includes controlling the storage means to store the second print data as compressed by the band unit.

47. A program product for receiving print data from an external apparatus and processing the print data, comprising:

code for a storage step, of storing in a storage means first print data of a first data format, a plurality of second print data of a second data format converted from the first print data and a plurality of attribute information corresponding to the respective second print data, the plurality of attribution information being different from each other;

code for a first storage control step, of controlling said storage step to store the first print data;

code for a second storage control step, of controlling said storage step to store the second print data, with the first print data being maintained in said storage means;

code for a determination step, of determining whether the second print data, appropriate to print attribute information of third print data received from the external apparatus, is stored in said storage means on a basis of the plurality of attribute information stored in said storage means;

code for an image generation step, of generating an image when said determination step determines that the appropriate second print data is stored in said storage means, overlaying image data based on the appropriate second print data and image data based on the third print data on each other so as to generate overlaid image data; and code for a conversion step, of when said determination step determines that the appropriate second print data is not stored in said storage step, converting the first print data stored in the storage step into the second print data based on the print attribution of the third print data, wherein the second print data converted by said conversion step is stored in said storage step with the print attribution of the third print data.

48. A program product according to claim 47, wherein said second storage means controlling step includes controlling the storage means to delete the second print data stored therein according to a storage capacity of the storage means.

49. A program product according to claim 48, wherein said second storage means controlling step includes controlling the storage means to again store the second print data of the second data format according to a storage capacity of the storage means.

50. A program product according to claim 47, wherein the program further comprises the step of converting the first print data stored in the storage means into the second print data.

51. A program product according to claim 48, wherein said converting step includes converting the stored first print data into the second print data according to a print condition of the third print data received from the external apparatus, and said second storage means controlling step includes controlling the storage means to store the converted second print data according to the print condition of the third print data.

52. A program product according to claim 49, wherein said converting step includes enlarging or reducing the first print data and then converting the enlarged or reduced first print data into the second print data.

53. A program product according to claim 49, wherein said converting step includes rotating the first print data and then converting the rotated first print data into the second print data.

54. A program product according to claim 47, wherein the second print data comprises bit map image data.

55. A program product according to claim 47, wherein the second print data comprises compressed bit map image data.

56. A program product according to claim 47, wherein the second print data comprises intermediate data formed with predetermined drawing elements.

57. A program product according to claim 47, wherein the second print data comprises form data used for generating a predetermined page form.

58. A program product according to claim 47, further comprising the step of receiving the first and second print data from the external apparatus, wherein said first and second storage means controlling steps include controlling the storage means to store the first and second print data, respectively, received in said reception step.

59. A program product according to claim 49, wherein said program further comprises the step of obtaining information on the storage means, wherein said converting step includes selecting the second data format from among a plurality of data formats according to the information obtained in said obtaining step.

60. A program product according to claim 47, wherein said second storage means controlling step includes controlling the storage means to store the second print data in a band unit, one page of the second print data being divided into bands, and wherein said overlaying step includes generating the overlaid image data by the band unit.

61. A program product according to claim 59, wherein said overlaying step includes overlaying image data based on the second print data and image data based on third print data on each other by the band unit so as to generate the overlaid image data.

62. A program product according to claim 59, wherein said second storage means controlling step includes controlling the storage means to store the second print data as compressed by the band unit.

* * * * *